United States Patent [19]
Melton

[11] Patent Number: 5,913,964
[45] Date of Patent: *Jun. 22, 1999

[54] INFUSER UNIT FOR MAKING BEVERAGES

[75] Inventor: Bruce W. Melton, Hinsdale, Ill.

[73] Assignee: Espire Incorporated, Chicago, Ill.

[ * ] Notice: This patent is subject to a terminal disclaimer.

[21] Appl. No.: 08/989,473

[22] Filed: Dec. 12, 1997

Related U.S. Application Data

[63] Continuation-in-part of application No. 08/766,978, Dec. 16, 1996, Pat. No. 5,775,205.

[51] Int. Cl.⁶ .............................. A47J 31/00; A47G 19/14
[52] U.S. Cl. .................................. 99/322; 99/279; 99/323
[58] Field of Search .............................. 99/322, 323, 316, 99/319, 279; 220/521, 713, 501, 371, 372

[56] References Cited

U.S. PATENT DOCUMENTS

| | | | |
|---|---|---|---|
| D. 282,615 | 2/1986 | Levine | D7/9 |
| D. 358,294 | 5/1995 | Leticia | D7/392.1 |
| D. 367,816 | 3/1996 | Cai | D9/431 |
| 370,141 | 9/1887 | Hobbs . | |
| 1,777,909 | 10/1930 | Brookes | 99/322 |
| 2,093,980 | 9/1937 | Linger | 99/322 X |
| 3,446,624 | 5/1969 | Luedtke | 99/71 |
| 3,566,770 | 3/1971 | Crossly | 99/289 |
| 3,579,351 | 5/1971 | Wege et al. | 99/77.1 |
| 3,631,793 | 1/1972 | Bednartz | 99/295 |
| 3,665,841 | 5/1972 | Hardy et al. | 99/281 |
| 3,724,359 | 4/1973 | Masters et al. | 99/281 |
| 3,797,642 | 3/1974 | Dobry et al. . | |
| 3,809,215 | 5/1974 | Dobry | 206/0.5 |
| 3,861,284 | 1/1975 | Costello | 99/321 |
| 3,870,220 | 3/1975 | Koury et al. | 229/1.5 C |
| 3,895,118 | 7/1975 | Rambold | 426/83 |
| 3,899,599 | 8/1975 | Rambold | 426/82 |
| 3,935,318 | 1/1976 | Mihailide | 426/80 |
| 4,074,827 | 2/1978 | Labe, III | 220/23 |
| 4,141,462 | 2/1979 | Rucci | 220/254 |
| 4,141,997 | 2/1979 | Syroka et al. | 426/79 |
| 4,211,156 | 7/1980 | Zimmermann | 99/287 |
| 4,278,691 | 7/1981 | Donarumma et al. | 426/80 |
| 4,333,583 | 6/1982 | Montemarano | 220/90.4 |
| 4,345,512 | 8/1982 | Moore | 99/323 |
| 4,443,481 | 4/1984 | Donarumma et al. | 426/82 |
| 4,478,346 | 10/1984 | Spong | 220/90.2 |
| 4,487,114 | 12/1984 | Abdenour | 99/295 |
| 4,503,992 | 3/1985 | Sitko et al. | 220/90.4 |
| 4,520,716 | 6/1985 | Hayes | 99/306 |
| 4,577,080 | 3/1986 | Grossman | 219/10.55 E |
| 4,589,569 | 5/1986 | Clements | 220/380 |
| 4,602,557 | 7/1986 | Yip | 99/279 |

(List continued on next page.)

FOREIGN PATENT DOCUMENTS

| | | |
|---|---|---|
| 637845 | 5/1928 | France . |
| 91 14 707 | 4/1992 | Germany . |
| 18416 | of 1889 | United Kingdom .................... 99/322 |
| WO 93 03973 | 3/1993 | WIPO . |

*Primary Examiner*—Reginald L. Alexander
*Attorney, Agent, or Firm*—Sidley & Austin; Hugh A. Abrams

[57] ABSTRACT

An infuser unit for making beverages in an associated container. The infuser unit attaches to the top of the associated container and includes a well portion for receiving and holding a charge of flavoring material. Heated water, or other liquid, is poured through the well portion into the associated container and then circulates between the inside and outside of the well portion to permit infusion of flavors from the flavoring materials to the liquid. A cover for the infuser unit is also provided that seats within the top of the well and forms a trough on its reverse side to collect excess liquid from the well after the infuser unit is removed from the associated container.

39 Claims, 13 Drawing Sheets

U.S. PATENT DOCUMENTS

| | | | |
|---|---|---|---|
| 4,605,123 | 8/1986 | Goodrum et al. | 206/0.5 |
| 4,629,088 | 12/1986 | Durgin | 220/254 |
| 4,688,479 | 8/1987 | Cunningham | 100/133 |
| 4,697,503 | 10/1987 | Okabe et al. | 99/306 |
| 4,726,956 | 2/1988 | Christie | 426/80 |
| 4,735,810 | 4/1988 | Dacal | 426/80 |
| 4,739,898 | 4/1988 | Brown | 220/203 |
| 4,785,723 | 11/1988 | Sheen | 99/279 |
| 4,821,630 | 4/1989 | Roberts | 99/323 |
| 4,864,921 | 9/1989 | Ross | 99/279 |
| 4,867,993 | 9/1989 | Nordskog | 426/77 |
| 4,875,475 | 10/1989 | Travers | 206/0.5 |
| 4,924,922 | 5/1990 | Johnson | 141/346 |
| 4,938,375 | 7/1990 | Fantacone | 220/901.4 |
| 4,997,015 | 3/1991 | Johnson | 141/346 |
| 5,036,755 | 8/1991 | Abdenour | 99/306 |
| 5,038,959 | 8/1991 | Patel | 220/366 |
| 5,168,140 | 12/1992 | Welker | 219/10.55 |
| 5,183,172 | 2/1993 | Boller | 220/270 |
| 5,197,624 | 3/1993 | Dodaro | 220/254 |
| 5,253,781 | 10/1993 | Van Melle et al. | 220/713 |
| 5,312,637 | 5/1994 | Midden | 426/433 |
| 5,363,745 | 11/1994 | Lin | 99/306 |
| 5,379,914 | 1/1995 | Martins | 220/719 |
| 5,393,843 | 2/1995 | Warden et al. | 220/771 |
| 5,402,904 | 4/1995 | Close | 220/254 |
| 5,424,083 | 6/1995 | Lozito | 426/82 |
| 5,460,286 | 10/1995 | Rush et al. | 220/306 |
| 5,477,979 | 12/1995 | Goessling et al. | 220/713 |
| 5,480,054 | 1/1996 | Midden | 220/202 |
| 5,497,917 | 3/1996 | Krimmel et al. | 222/475.1 |
| 5,509,568 | 4/1996 | Warden et al. | 220/711 |
| 5,529,179 | 6/1996 | Hanson | 206/219 |
| 5,531,347 | 7/1996 | Goulding | 220/256 |
| 5,545,879 | 8/1996 | Brotz | 219/689 |
| 5,609,194 | 3/1997 | Link et al. | 141/331 |
| 5,613,616 | 3/1997 | Monus | 220/791 |
| 5,613,619 | 3/1997 | Van Melle | 220/712 |
| 5,620,724 | 4/1997 | Adler | 426/77 |
| 5,635,229 | 6/1997 | Ray | 426/112 |
| 5,644,972 | 7/1997 | Dahmen et al. | 99/280 |
| 5,653,362 | 8/1997 | Patel | 222/156 |
| 5,657,898 | 8/1997 | Portman et al. | 220/712 |
| 5,678,472 | 10/1997 | Millman | 99/279 |

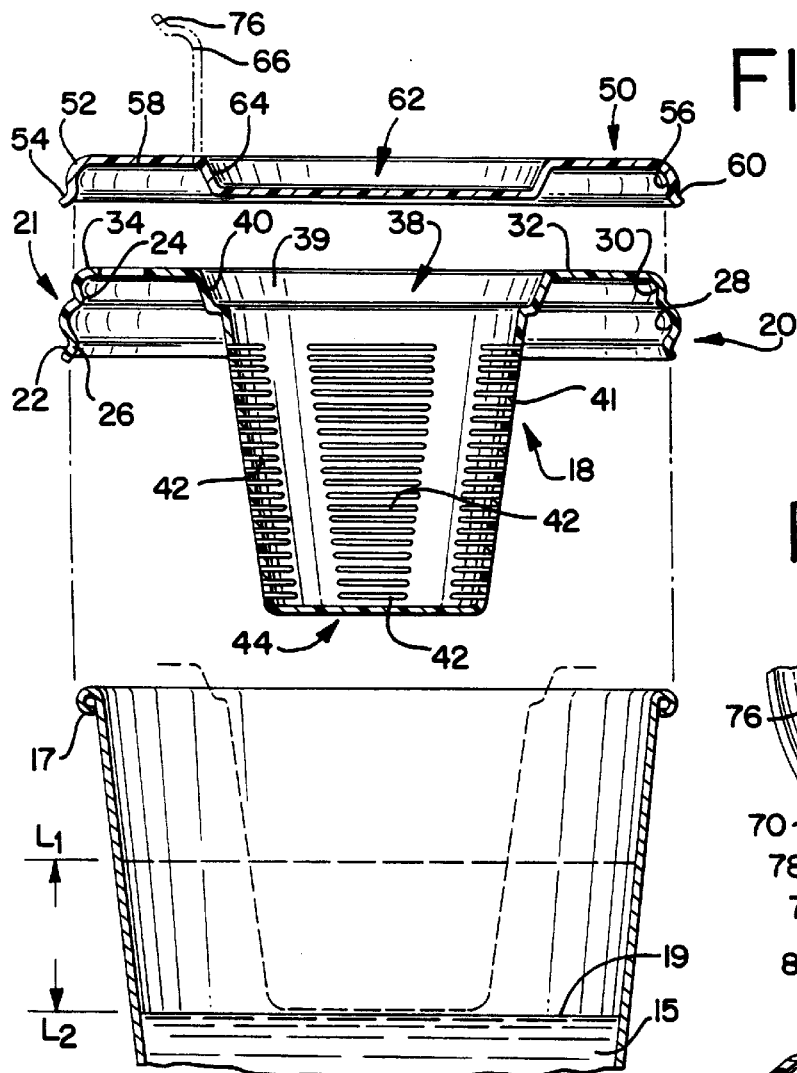
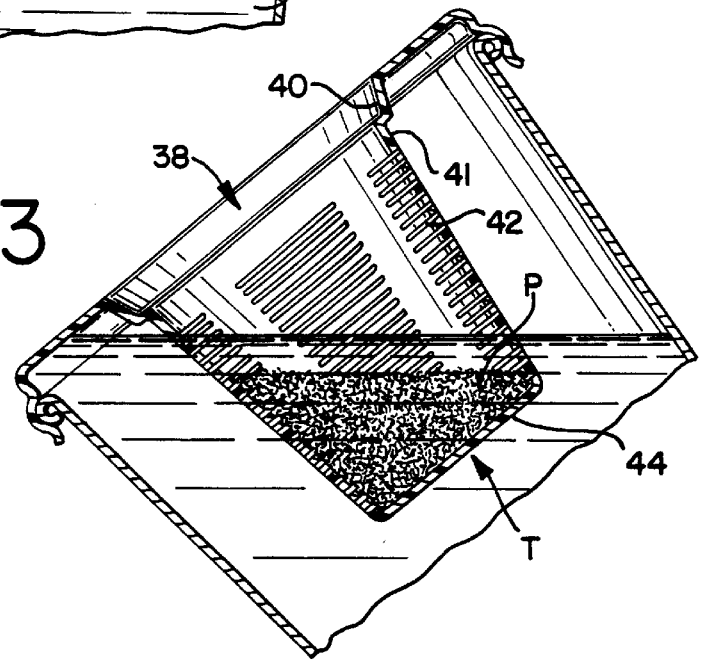

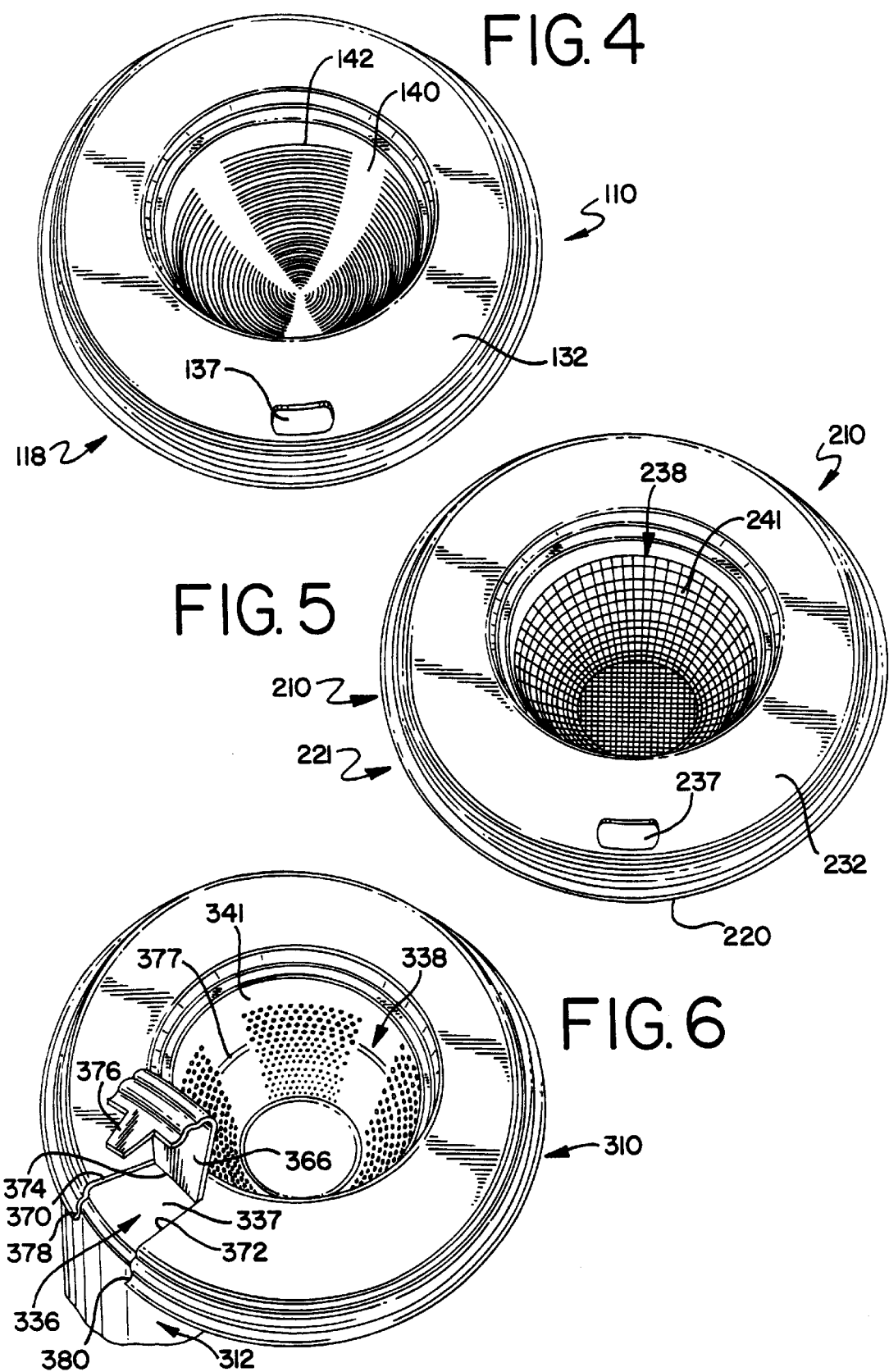

FIG. 7
FIG. 8
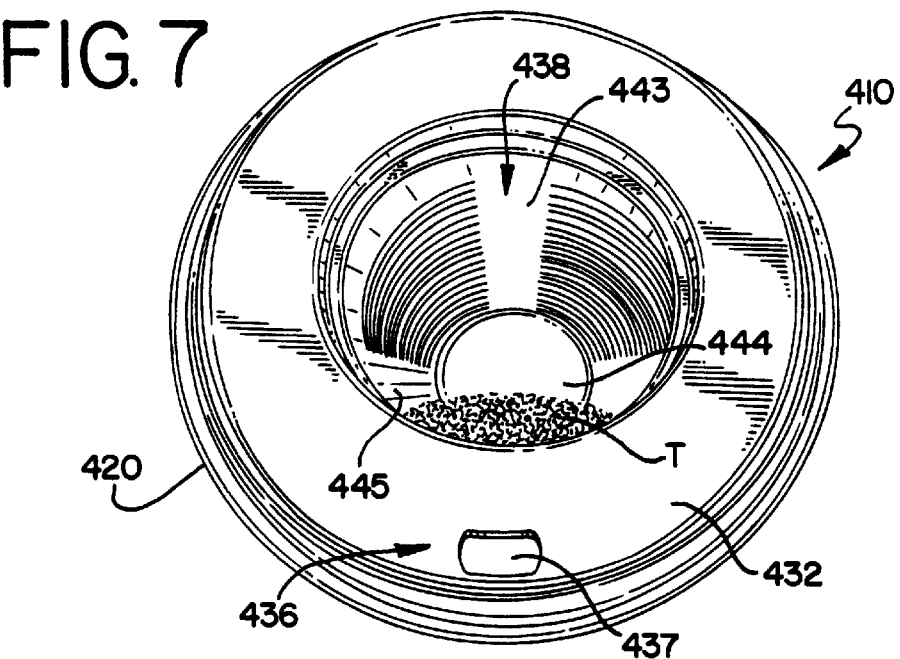
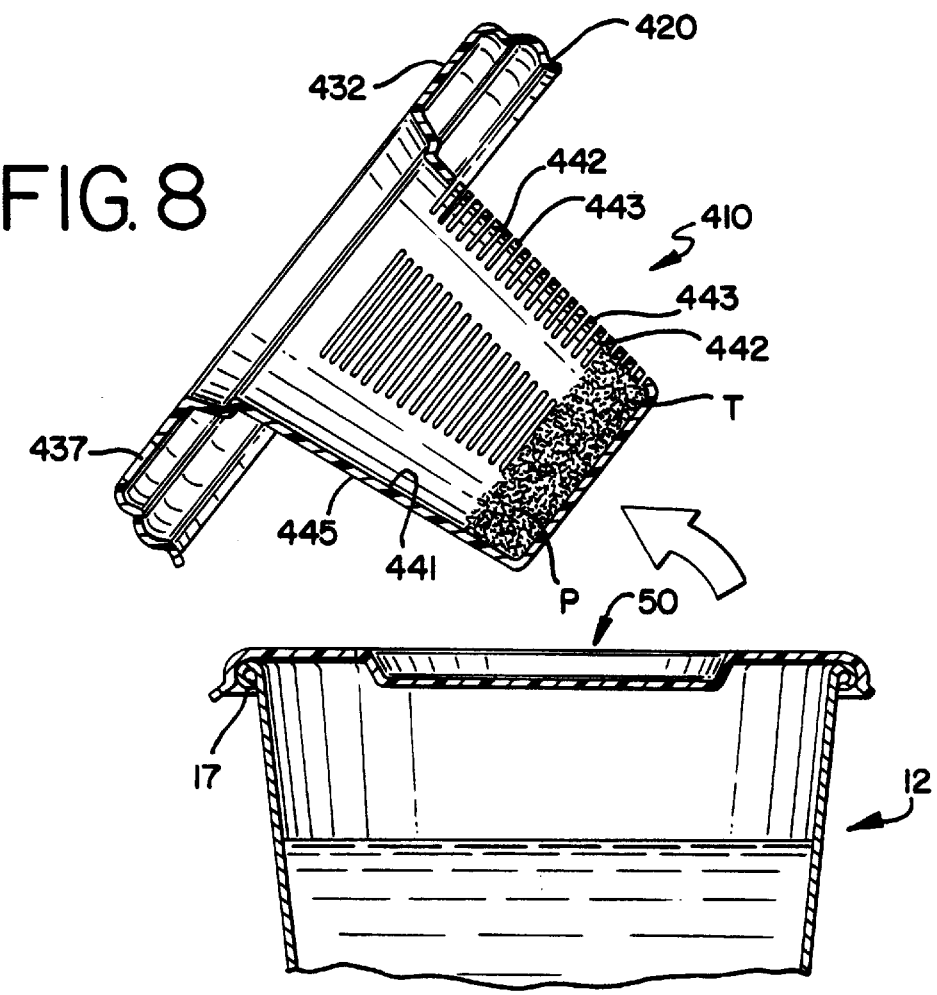

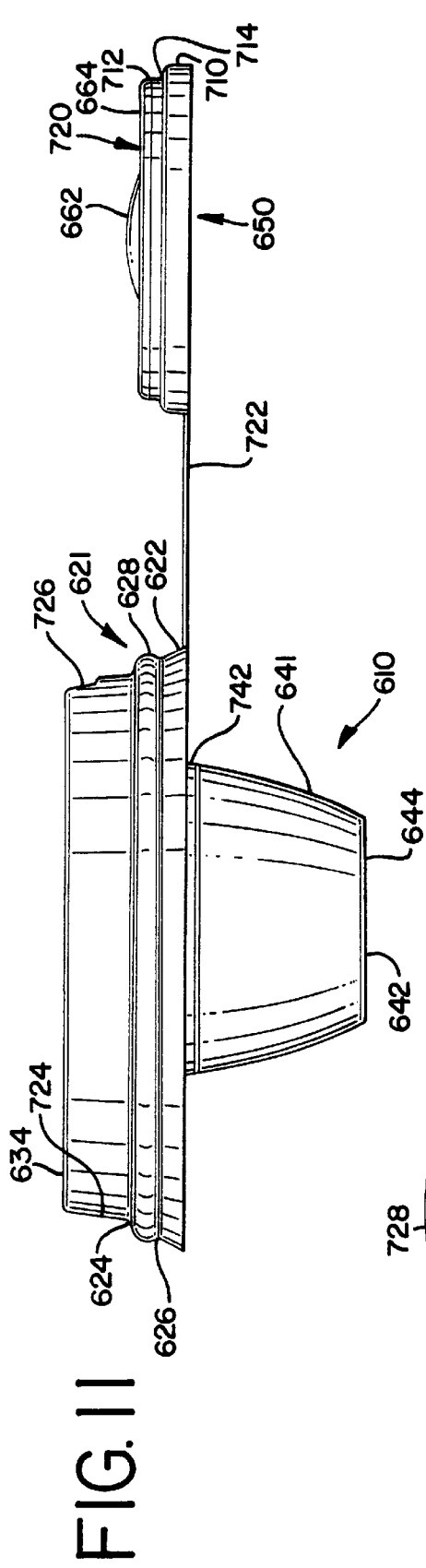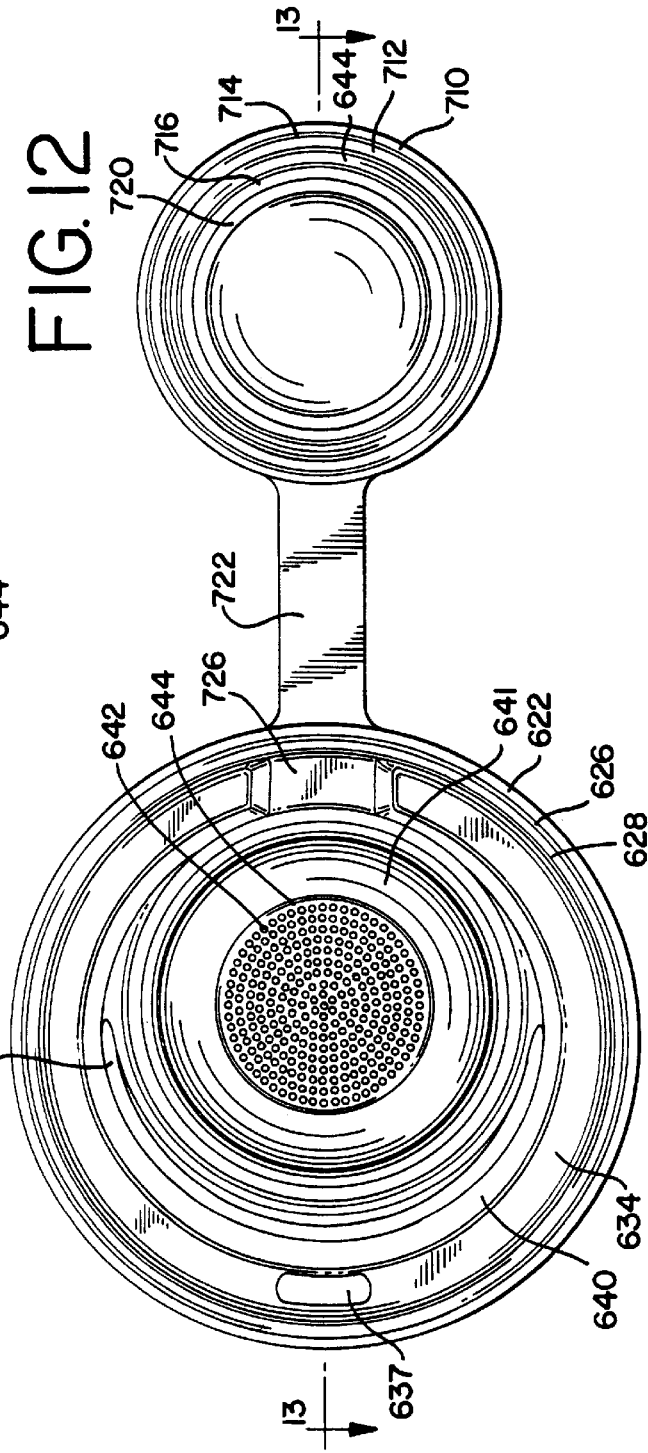

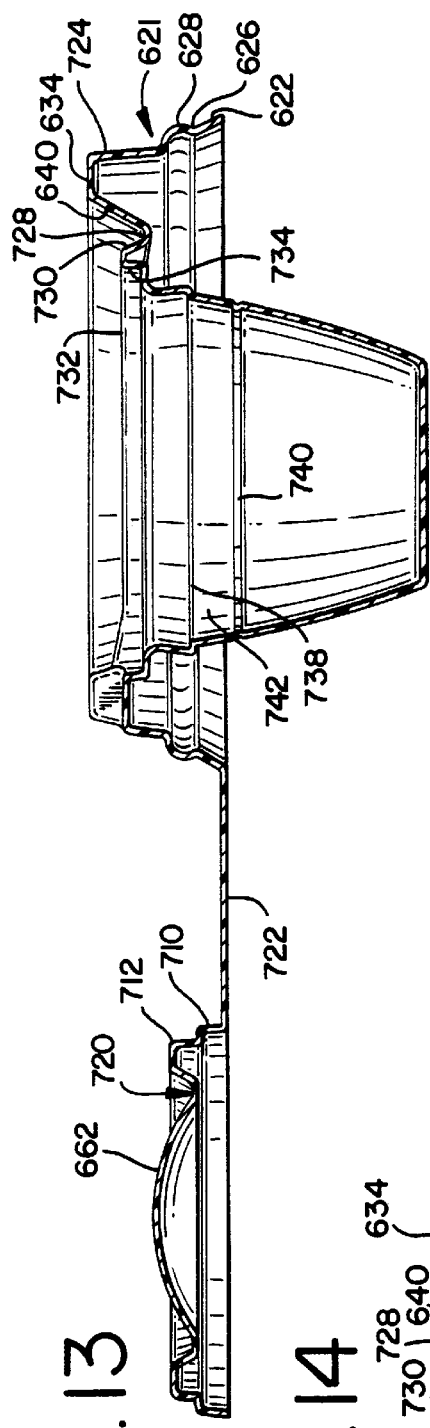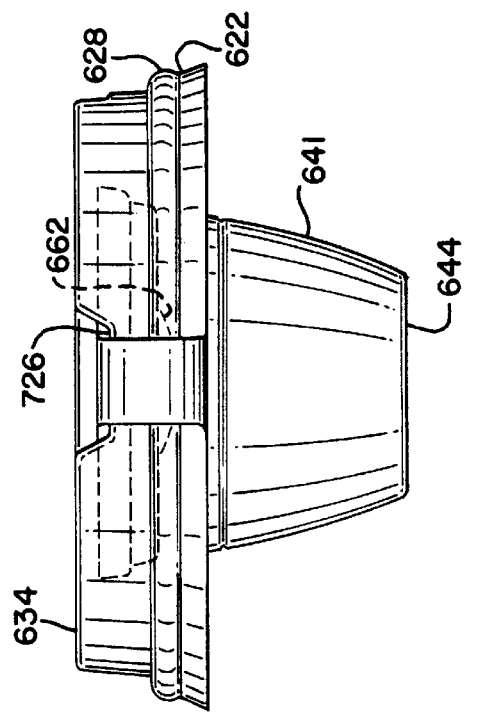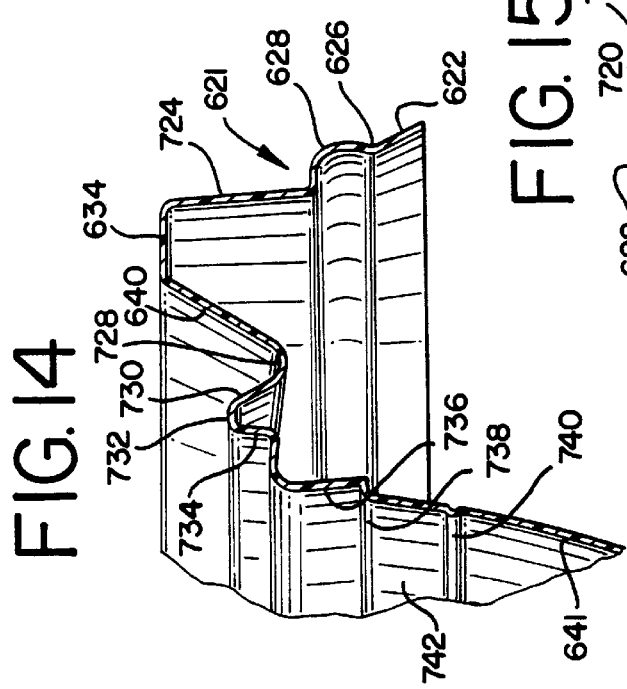

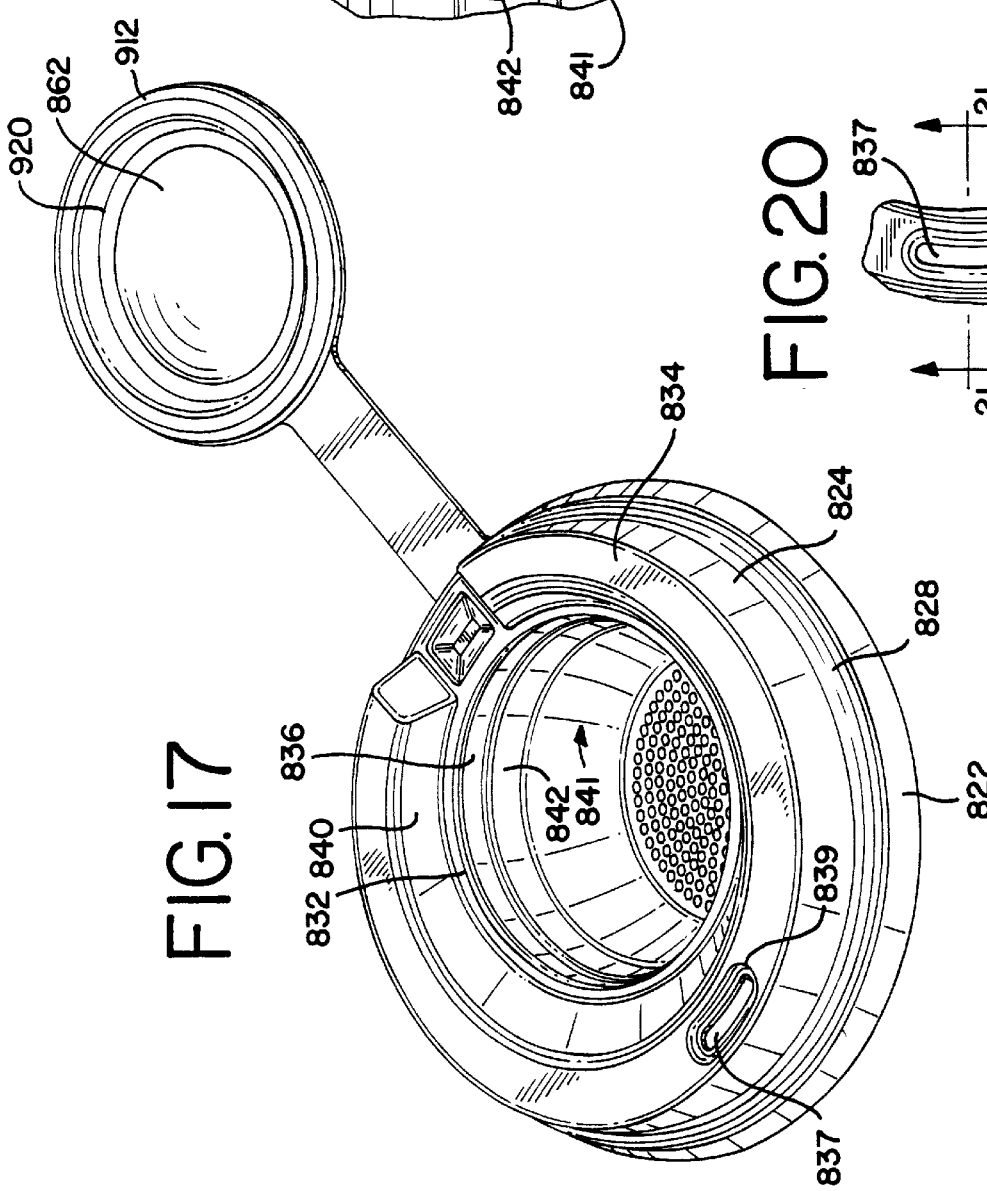
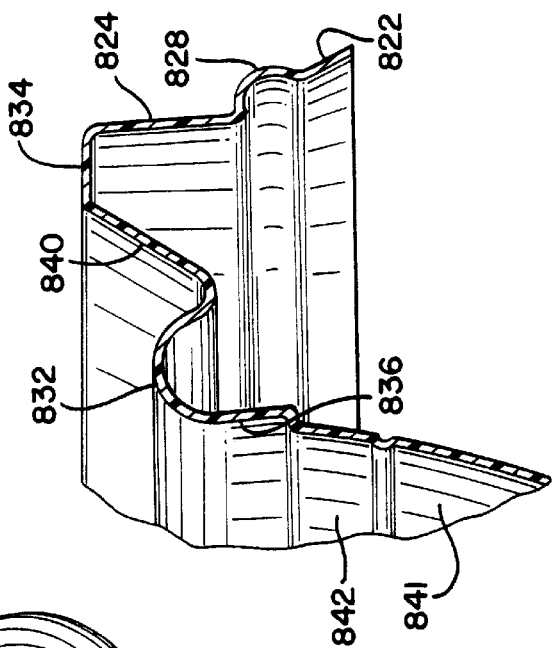
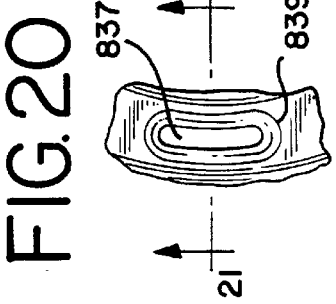
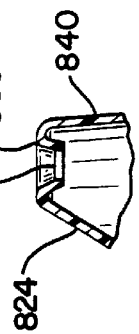

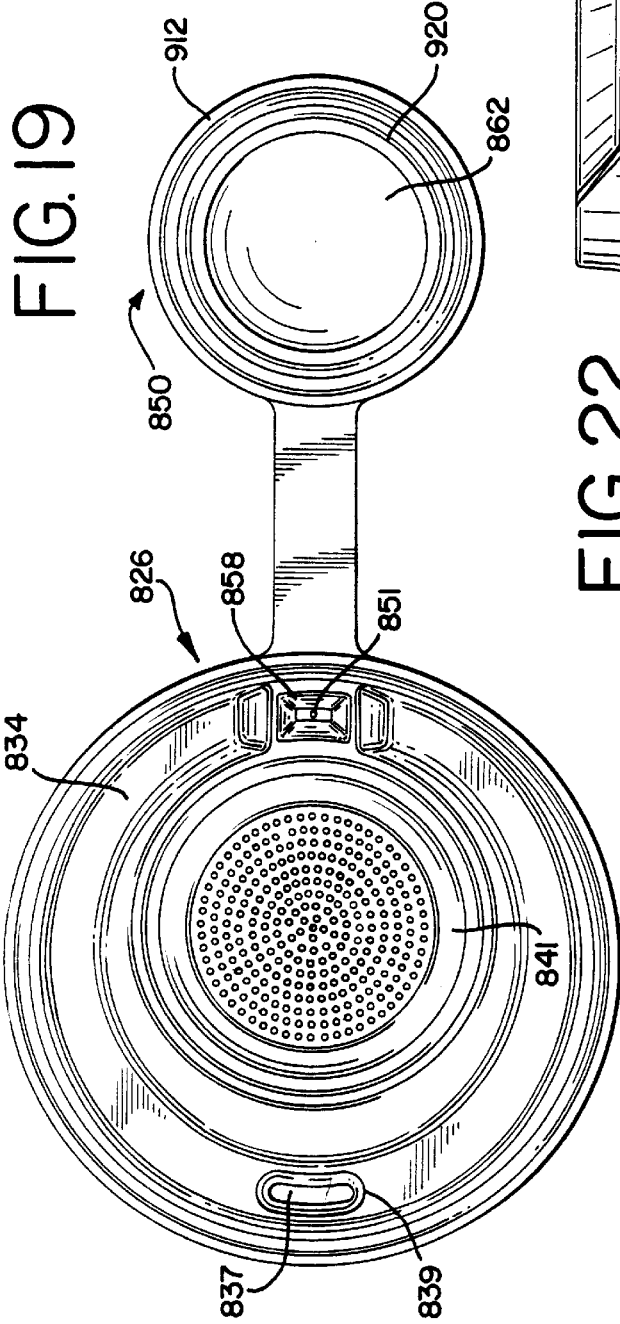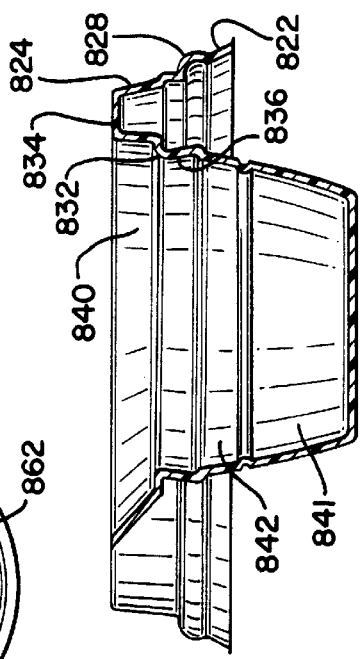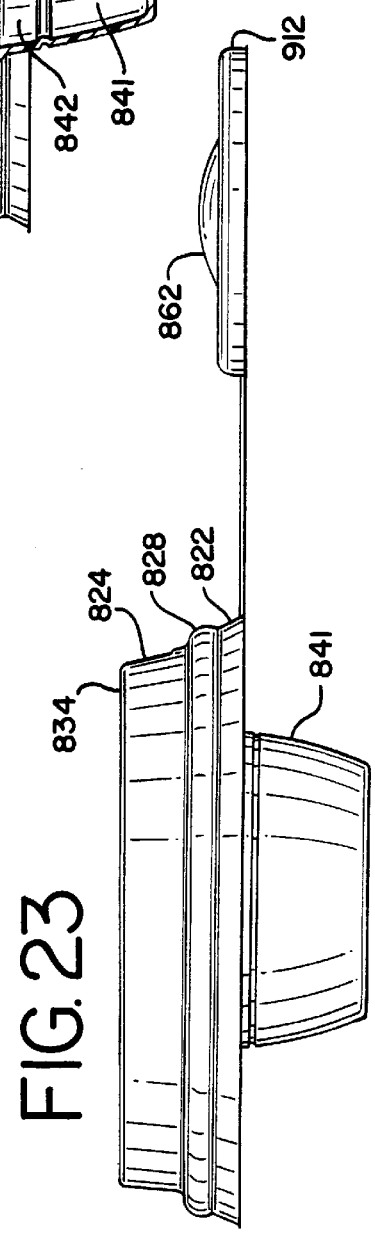

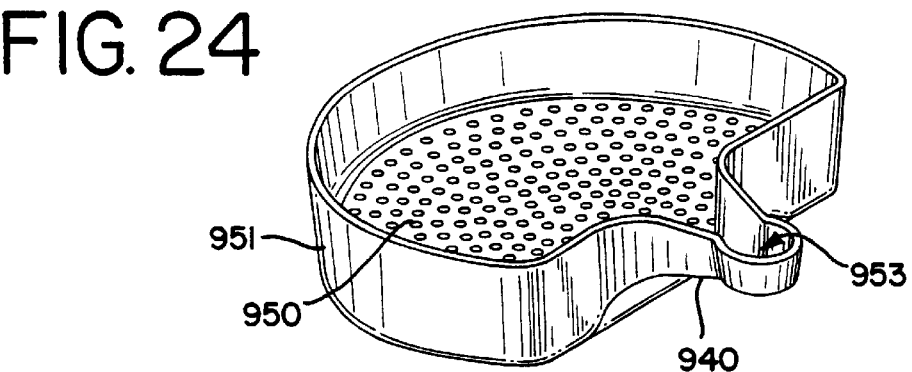
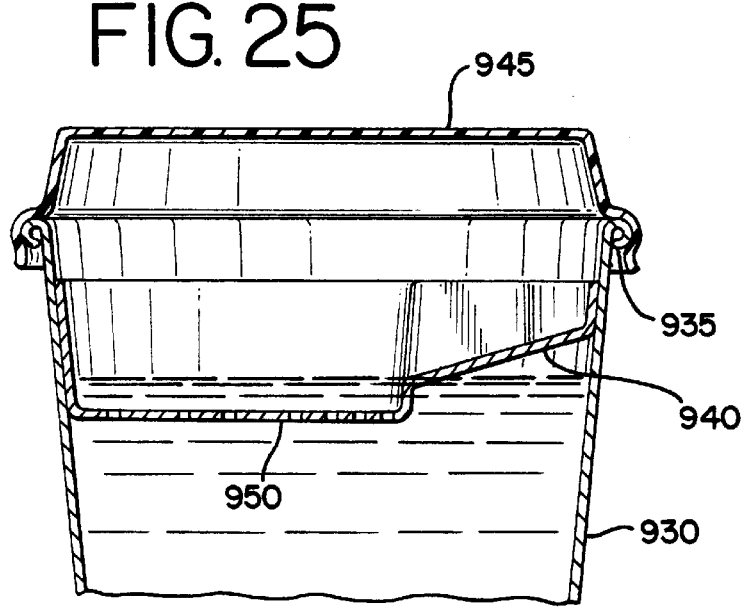
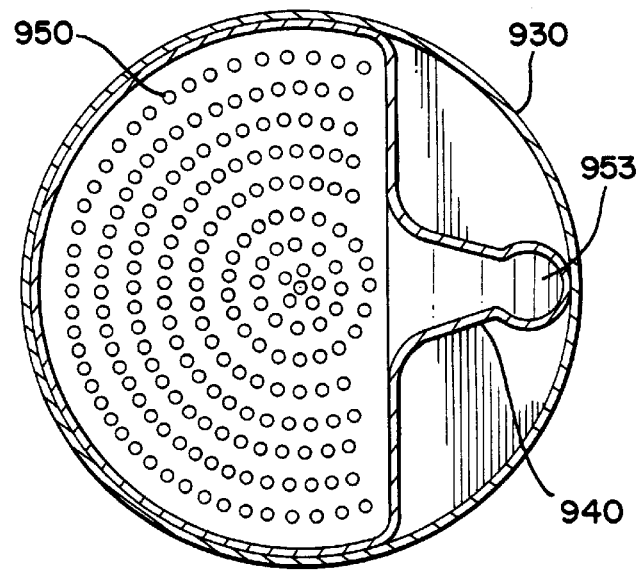

INFUSER UNIT FOR MAKING BEVERAGES

This application is a continuation-in-part of U.S. application Ser. No. 8/766,978, filed Dec. 16, 1996, now U.S. Pat. No. 5/775,205, which is incorporated herein by reference.

BACKGROUND OF THE INVENTION

The present invention relates generally to tea making and dispensing, and more particularly, to an infuser for making tea, "herbal teas," coffees, flavored coffees and teas, and other steeped beverages. The infuser of the invention provides improved performance, convenience and other advantages in use, and is preferably a low-cost, disposable unit.

While the infuser unit, in its preferred embodiments, relates to infused beverages, such as loose tea, the infuser unit has broader applications. The present invention encompasses a novel method of making beverages, both infused and brewed. Additionally, the present invention relates to a novel construction of a lid for beverages and novel methods of using the lid in the making of different types of beverages. The novel construction of the lid and infuser unit provides other advantages that are not necessarily related to making of the beverage, as will be evident from the description set forth below.

In recent years, there has been a rapid upsurge of interest in so-called gourmet coffee beverages. The numerous flavors and varieties of coffees have been heavily advertised and promoted. The public has become acquainted with specialty coffee shops serving a large variety of these products. Many so-called premium coffee shops receive high prices for their products, whether sold for on-premises or off-premises consumption.

Owing in part to the increasing saturation of the "gourmet" coffee market, and in response to a perceived need for lower-caffeine "healthy" beverages, there has been a growing interest in the consumption of teas and "herbal teas" (also known as "tisanes" and "infusions") in the United States. Worldwide, teas have a much longer tradition of acceptance than coffee and are consumed on a very widespread basis.

While tea brewing and consumption differ from coffee brewing and consumption in several important respects, the products and methods in other respects present similar problems, many of which are overcome by the present invention.

Prior to the advent of the tea bag, tea was customarily prepared by placing tea leaves in a pot, over which leaves near-boiling water was poured and steeped until a beverage of the desired strength was reached. In order to avoid the buildup of bitterness or other undesirable flavor, it was known to provide screens or strainers whereby the tea leaves could be confined for removal at a desired point in the brewing cycle. The use of strainers and the like, however, has the drawback of being relatively clumsy and inefficient from an equipment standpoint. Strainers require frequent cleaning and require the user to remove the strainer when the desired strength of beverage has been achieved. Strainers are also difficult to fill, seal, and to remove and store without dripping. Strainers are also often too small to allow sufficient circulation of water, particularly when using the highest quality "full leaf" teas.

While the tea bag addresses certain of the disadvantages with straining equipment, it too, has many disadvantages. Most bagged tea is of low quality, and the process of placing tea leaves in bags involves the crushing and breaking of the leaves, to the considerable detriment of flavor. The relatively small size and fine texture of the tea bag restricts the circulation of the leaves in the hot water, inhibiting rapid and full diffusion of the flavors into the body of the liquid. In addition, used tea bags, like the aforementioned strainers, create removal and disposal problems, particularly when the beverage is sold "to go" or on a "carry out" basis.

Another disadvantage of the tea bag is that it typically is available in one or two sizes only, effectively predetermining beverage strength for "carry out" products. Tea beverage strength is often varied by adjusting the proportion of water added to the leaves. However, for on-premises brewing of tea that is to be sold "to go," cup sizes are generally standardized and, consequently, strength variation is not easily achieved where the size of the tea bag is fixed.

Bagging tea also adds significant cost to the price of the beverage. Commonly, tea is enclosed in a bag (often, with an attached string and tab to facilitate removal); the bag is in turn placed in a paper or foil envelope or sleeve, and then the envelope or sleeve is placed in a box. The cost of these steps and/or materials is substantial. Moreover, tea bags are far more bulky per serving than "loose" teas, thereby increasing the costs of shipping, storing, and serving tea to consumers.

Another significant economic drawback of "bagging" tea is the cost of buying, maintaining, and operating expensive and specialized bagging equipment. Tea "co-packers" typically require minimum "run" quantities for a particular bag filling of 100,000 bags or more. A vendor's ability to commit to a wide variety of flavors in these quantities is considered prohibitively costly for all but the most established companies. Another difficulty with "co-packing" tea bags arises from the large scale, mass production aspect of such bagging: there can be considerable delays in scheduling and completing production runs. Obviously, passing tea ingredients—many of which are imported—through middlemen such as co-packers and their distributors adds to the cost of the product, and the inherent delay may also compromise freshness and flavor.

Many tea drinkers are also acutely aware of environmental problems and, for such consumers, there is a negative reaction to bleached papers that are often used in tea bags. Moreover, the use of strings and staples to facilitate the removal of the bag at the desired point in the brewing cycle creates problems in the disposition of such products, including separating them from waste streams. "stringless" tea bags are designed to address this problem, but they are clumsy for servers, who should, for sanitary reasons, use tongs to place the bag in a cup. Stringless bags also subject the user to certain risks and inconveniences in removing the bag at the desired point in the brewing cycle: often, stringless bags are plucked out of the hot tea with the user's bare fingers.

The foregoing disadvantages associated with tea bags are exacerbated when the beverage is sold "to go." The bag must be removed from the beverage between three and five minutes after purchase, typically too long to wait at the retail establishment and too soon before an appropriate receptacle for the dripping bag is located. Moreover, using a tea bag in a cup having a removable lid requires the user to open the lid in order to remove the bag, unless some sort of cumbersome bag receptacle is incorporated into the lid. The high temperature of the water creates a risk of injury if the cup is spilled while trying to remove the lid.

The foregoing aspects of the prior art practices argue strongly for using brewing methods other than those involving tea bags and conventional cup lids. However, the use of auxiliary equipment, including strainers, also creates difficulties in addition to the requirement that the equipment be manipulated after brewing and is hence unsuitable for take-out operations. In contrast, the present invention, in several embodiments described below, avoids or eliminates some of the disadvantages related to use of tea bags and other brewing methods while still permitting the use of tea bags or other such brewing methods. The present invention, in several embodiments described below, also overcomes some of the difficulties and disadvantages faced by lids for beverages, as those lids are conventionally constructed in the prior art. Yet, the present invention, in some Embodiments, can also be used with bagged tea or other precharged infusions or precharged brewed beverages, such as coffee bags and the like.

Referring now to the characteristics and advantages of bulk, "loose" tea as far as potential customer satisfaction and retailing profit are concerned, bulk tea is almost invariably perceived to be of higher quality than bagged tea. Bulk tea also requires less space per serving than bagged teas, for which allowance must be given for the waste space within the bag, and for the envelopes, sleeves, or boxes. Bulk tea is much more easily shipped and stored, and holds out the potential for saving a great amount of beverage preparation counterspace. In order to serve a popular market successfully, it is believed that a vendor should be able to offer at least three to four varieties of black tea, several varieties of green tea, a significant number of herbal teas and a number of flavoring enhancers or additives. These aggregate at least 10 to 20 varieties of teas and flavoring products, all of which are available at lower cost in bulk, "loose" form and which can be shipped and stored in much smaller containers. Moreover, bulk tea container, such as jars, can be easily resealed to retain freshness.

Bulk, "loose" forms of herbal teas are also ideal because their leaves are more fragile than those of traditional teas, and hence less susceptible to bagging. Herbal teas are presently believed to be the fastest growing product in terms of tea market share.

A particular problem associated with bags of blended or mixed teas is shelf life. Because particular teas or herbs may go stale faster than the remainder of the bag contents, the shelf life of the entire product is tied to the shelf life of the least stable ingredient. If flavoring agents or flavoring augmenters were available that could be used with existing teas having longer shelf life, then the shelf lives of the composite products could be effectively extended without excessively burdening the inventory or stockkeeping process. Ensuring freshness of the entire beverage product and thereby maximizing flavor is always desirable, especially in a "gourmet" market.

In contrast to bagged teas, bulk or "loose" teas can be separately identified and kept in bins or jars from which the unique beverages can be custom blended "to taste" by each retailer to the order of a particular customer.

The growth of "herbal" teas which are of variable strength in relation to other teas, the growth of flavored teas, and the use of flavoring agents in tea such as spices and dried fruits, all argue strongly for having teas and their flavoring agents available in bulk quantities for custom blending "to taste" at the brewing site, especially for take-out customers. From the above, it is clear that a tea infuser of a proper design, i.e., a container for tea leaves in a cup or other brewing container, would serve many needs of tea retailers and consumers.

Besides tea, there are other hot beverages that can benefit from an infuser of proper design. For example, coffees and flavored coffees are quite popular, but must be made and served in quantity rather than to a customer's individual taste. Another example is the Asian hot milk based beverage known as "chai," whereby hot milk is flavored with cinnamon, pepper, ginger, crushed or shredded spices, herbs, and/or other flavoring agents. The use of a device that would enable such flavors to be added to hot milk on a custom basis would have a widespread appeal to chai fanciers, a rapidly-growing segment of the "gourmet" beverage market.

A properly-designed infuser would also facilitate the making of iced tea. An ideal situation would be to enable extremely hot water to be passed over a source of loose, fresh tea leaves custom-blended "to taste" in the infuser, sterilizing the leaves and extracting flavor almost instantaneously before being mixed with ice in the cup to achieve cooling. According to one or more embodiments of the invention, an infuser capable of simplifying the preparation and serving of iced tea is provided, and this infuser achieves other advantages as well.

Referring now to other advantages that might be gained by infusers of proper design, it would be advantageous if a permeable infuser could be made that would serve as a baffle below the surface of the liquid in the cup, thus preventing undesired "sloshing" of the beverage. Another advantage of an ideal infuser would be the ability to position tea leaves in such a way that, after the liquid level in the cup were lowered slightly, the strength of the beverage would not continue to increase, all without the risks of removing or repositioning the lid. Another advantage of an ideal infuser would permit the removable lid for a beverage cup to be utilized in the making of the beverage.

Still further, with products including coffee but primarily tea, wherein vapor phase flavor is inhaled by the user, a combination cover and infuser with an opening or recess to accommodate the nose of the user could favorably augment the apparent flavor of the product. In an ideal infuser, the wet, swollen, spent leaves might also serve as something analogous to a plug to augment the flavor of the liquid by sealing the container against loss of heat and volatile constituents.

Regarding the matter of serving tea for on-premises consumption or take out use, the so-called "gourmet" convenience coffee shops are confronted with difficulties not applicable to coffee. Thus, while a large pot of coffee can be brewed and many customers can be served from a common pot of large size, a principal advantage of tea is that the user may choose from a large number of flavors. This and the nature of the brewing process generally militate against keeping a large quantity of already-brewed tea on hand.

An ideal circumstance would be one wherein "loose" teas, "herbal" teas, and/or flavoring agents could be sanitarily placed in an exactly desired amount or proportion, as by a scoop or the like, into an infuser which could be associated with a cup into which extremely hot water could be added by passing over the leaves. This would enable the consumer to allow flavor to develop for the requisite time period and thereafter either remove the tea leaves and discard them without dripping, or lower the water/beverage level to isolate the tea from the water and thus terminate flavor build-up or change. Under further idealized conditions, the user could begin to sip the tea from the container for sampling purposes and thereby automatically remove the tea leaves from the liquid by lowering its level in the cup rather than by removing a bag or any auxiliary equipment. In some circumstances, the user could remove the lid and turn it upside down in which position the lid would collect moisture and other drippings and avoid the difficulties of disposal of a tea bag or other brewing device. The user could also remove the lid and turn it upside down and reposition it in the beverage container.

In view of the failure of the prior art to provide a tea infuser having the above-described desirable characteristics, it is an object of the present invention to provide an improved infuser and brewing apparatus for tea, coffee or similar infused or brewed beverages.

Another object of the invention is to provide an infuser which is capable of being manufactured reliably at low cost and in a single unit that incorporates one or more of an infuser device, a beverage container lid and a cover.

Still another object of the invention is to provide an infuser which includes a perforated well or pocket, centrally located in some embodiments, which can remain in place over the open top of a cup to seal the margins of the same, and which permits confining a charge of tea leaves or coffee grounds or predetermined portions of tea or coffee in bags and the like, to the well or pocket for infusion into the hot water, preferably as it is being poured over the tea leaves into the infuser well and thence into the cup. In some embodiments, the infuser well can be removed from the lid portion of the infuser unit and precharged and snapped into place in the lid, or the lid portion can be used separately without the infuser well, which provides a novel construction of a lid with a central opening.

A further object of the invention is to provide a combination infuser and beverage cup cover that will provide a drinking outlet area, a well for retaining tea leaves or coffee grounds, and be of a configuration permitting the nose of the user to be accommodated while the container is tipped during sipping.

A still further object of the invention is to provide a disposable tea infuser or coffee-brewing device of a design simplifying compact storage of large number of such infusers.

An additional object of the invention is to provide a beverage infuser of a type that is readily adaptable to mass production manufacture, and wherein the portion of the well receiving the tea may be made from any one of several materials, using a choice of methods. Additionally, the well may be removed from the infuser unit and the unit used only as a lid, or the infuser well may be precharged and then snapped into place in the lid at the time of beverage preparation.

A further object of the invention is to provide a low cost disposable infuser or brewing device which permits ready retention and removal of tea leaves or coffee grounds with the lid when desired, in a neat manner that will not create dripping problems such as those that arise in the use of a tea bag. Another object of the invention is to provide an infuser unit that need not be removed from the beverage cup in order to have access to the beverage to add condiments, and thus avoiding the safety issues involved in removal of a lid to add condiments and replacement of the lid over condensate that may have formed on the rim or ridge of the beverage container.

A still further object of the invention is to provide an apparatus which will simplify the formulation, brewing and serving of tea and coffee in retail establishments, with a view towards providing customer access to a variety of teas, and greater satisfaction to tea drinking customers.

The foregoing and other objects and advantages of the invention are achieved in practice by providing in several embodiments, a disposable, low cost infuser for removable association with a drinking container wherein the infuser includes a body preferably having a container attachment portion such as a ribbed or beaded skirt, an upper, generally annular surface with a drink-through area in its outer margin, and further including a well or pocket portion with an open top, permeable walls or a permeable bottom extending sufficiently downwardly into an associated container so that the lower portions of the well lie initially below, and as the beverage is consumed, just above, the top surface of the liquid beverage.

The foregoing and other objects and advantages, including inherent objects and advantages, are also achieved in part by forming such a container from a plastic, foam, or waterproofed paper material in a stackable form, and with the infuser being constructed and arranged so as to accommodate an attached or separate auxiliary lid or closure cap to facilitate transportation of the filled beverage cup and infuser without spillage in use and retain the heat of the beverage when served hot.

The manner in which the foregoing and other objects and advantages are achieved in practice will become more clearly apparent when reference is made to the following detailed description of the preferred embodiments of the invention set forth by way of example and shown in the accompanying drawings wherein like reference numbers indicate corresponding parts throughout.

SUMMARY OF THE INVENTION

In several of its preferred embodiments, the present invention provides an infuser unit having a container gripping or attachment portion for attachment to a beverage cup or container, an annular cover panel portion that extends radially inwardly from the container attachment portion, a well portion with walls that extend downwardly from the annular cover panel and a drinking area formed in the annular cover portion. Loose tea or other infusible or brewable beverage grains, either loose or pre-packaged, are placed in the well portion and hot water is poured into the well from above the annular portion.

The bottom panel of the well is preferably permeable to liquid so that the water will flow over the beverage grains and then through the permeable bottom of the well into the beverage container. In this manner, tea or another similar beverage is infused or brewed by the water passing over the tea leaves or infusable beverage grains. The well portion of the infuser unit preferably extends down far enough so that the tea leaves in the bottom of the well will be below a level of liquid in the container. In this manner, the tea will continue to steep or brew as the water level in the beverage container is above the level of the tea leaves in the bottom of the well. In an embodiment of the infuser for brewing coffee, the well need not extend below the water level in the associated container.

The infuser unit preferably snaps over the beverage container in order to be secured to the container. With the infuser unit of the present invention, the beverage container lid, which includes the infuser unit, is utilized in the making of the beverage. Moreover, access is permitted to well portion of the container to add tea leaves, add hot water and add other condiments without needing to remove the lid from the container. In several embodiments, an attached or separate snap-in lid or cover is provided that covers the well portion to retain heat and also prevent spillage. In other embodiments, the lid alone without the infuser well provides a beverage lid that permits access to the beverage in the associated container through the centrally located aperture.

BRIEF DESCRIPTIONS OF THE DRAWINGS

FIG. 2 is a fragmentary exploded vertical sectional view of the container, infuser, and one form of optional cover for the unit;

FIG. 2A is a fragmentary perspective view showing the cover of FIG. 2 in place over the infuser, with the drinking openings in registry with each other;

FIG. 3 is a vertical sectional view, similar to that of FIG. 2, but showing a plug of tea leaves formed in the well portion of the infuser to confine liquid flow to the opening in the drinking area as the cup is being used;

FIG. 4 is a perspective view of one form of infuser made according to the invention and showing a well of generally conical form with narrow slots in the walls of the well portion;

FIG. 5 is a view similar to that of FIG. 4 but showing a well of frusto-conical shape with walls comprised of a fine mesh or woven material;

FIG. 6 is a view similar to that of FIGS. 4 and 5, but showing a cup with an infuser having a plurality of fine perforations in the well wall and a lift tab forming a drinking area in the outer margins of the infuser;

FIG. 7 is a view similar to that of FIGS. 4–6 but showing an embodiment of the invention wherein one sector of the circumferences of the infuser pocket wall and the entire bottom wall are made from an imperforate material so as to minimize dripping when the infuser is removed from the cup;

FIG. 8 is a vertical sectional view showing the removal of the non-drip infuser for disposal and placing an auxiliary cover such as that shown in FIG. 2 over the container opening;

FIG. 11 is a side view of the infuser unit and cover of FIG. 10;

FIG. 12 is a top view of the infuser unit and cover of FIG. 10, illustrating the well portion offset away from the drinking area FIG. 13 is a sectional view of the infuser unit and cover taken through liners 13—13 of FIG. 12;

FIG. 14 is a fragmentary sectional view of a portion of the infuser unit of FIG. 13 illustrating the container attachment portion and annular top panel in detail;

FIG. 15 is a fragmentary sectional view of a portion of the cover of FIG. 13 illustrating the cover unit in detail;

FIG. 16 is a side view of infuser unit of the FIG. 13 illustrating the cover seated within the infuser unit;

FIG. 17 is a perspective view of another preferred embodiment of the infuser unit;

FIG. 18 is a fragmentary sectional view of a portion of the infuser unit: of FIG. 17 illustrating the container attachment portion and annular top panel in detail;

FIG. 19 is a top view of the cover and the infuser unit of FIG. 17;

FIG. 20 is a fragmentary top view of the drinking area of the infuser unit of FIG. 17;

FIG. 21 is a sectional view taken along lines 20—20 of FIG. 20;

FIG. 22 is a fragmentary sectional view of the infuser unit of FIG. 17;

FIG. 23 is a side view of the infuser unit and cover of FIG. 17;

FIG. 24 is a perspective view of another embodiment of the infuser unit of the present invention in a beverage container;

FIG. 25 is a side sectional view of the infuser unit of FIG. 24 inserted in the beverage container;

FIG. 26 is a top view of the infuser unit of FIG. 24 inserted in the beverage container;

DESCRIPTION OF THE PREFERRED EMBODIMENTS OF THE INVENTION

While it will be understood that the invention may be embodied in somewhat different forms and that different materials may be used in the manufacturer of the preferred forms of product, a description will be given of several embodiments of the present invention. In at least one such embodiment, a removable infuser is intended for association with a disposable drinking cup of moderate capacity, such as 8–20 ounces, and wherein most or all of the infuser is made from a thermoformed sheet plastic material.

Figure 1:
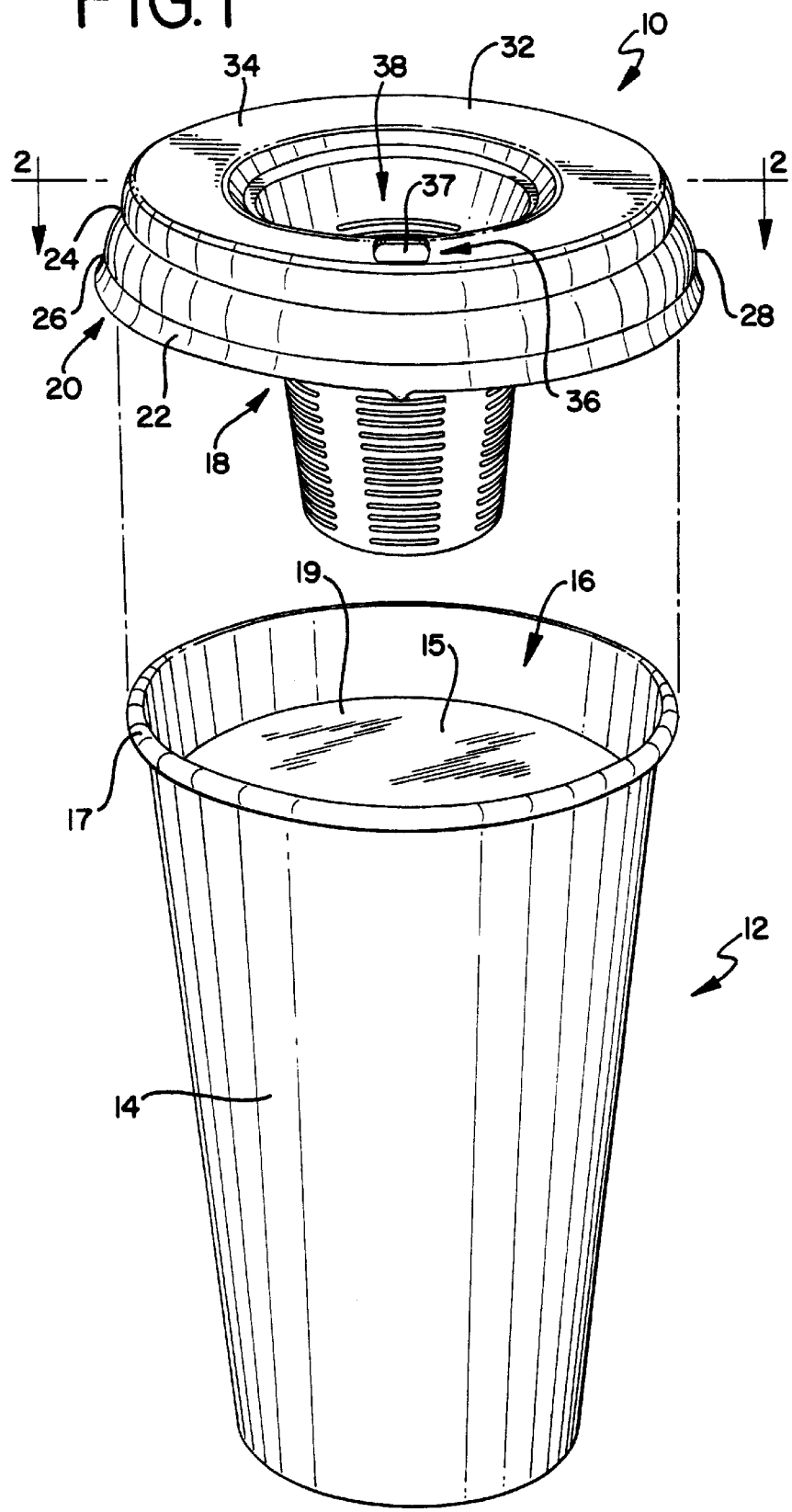
FIG. 1 is a perspective view of the infuser unit of the invention, showing it in exploded relation to a drinking cup filled with a liquid.

Referring now to the drawings in greater detail, FIGS. 1–3 show a low cost disposable infuser unit generally designated 10 of the invention to be removably associated with a cup or like drinking container generally designated 12 for liquid beverages. The container 12 includes rounded sidewall portions 14, an open top generally designated 16 defined in part by a rim 17, preferably in the form of a roll or curl formed in the top edge of the container 12. Liquid 15 is shown to have an upper surface 19 of a desired initial level. In one preferred embodiment, the container is made from a coated paper material for the best combination of stability, economy, and low heat transfer.

The infuser unit 10 is shown to comprise a onepiece body generally designated 18, including a radially outer skirt generally designated 20 and, as best shown in FIGS. 2 and 3, to include a container rim gripping portion generally designated 21, in this case comprised of a tapered bottom skirt flange 22, upper and lower beads 24, 26 defining therebetween a seating groove 28 adapted to engage the rim portion 17 of the container 12. The tapered bottom flange 22 serves as a pilot diameter portion for assistance in seating the infuser 10 on the container 12.

In one preferred form shown in FIGS. 1–3, a second inner groove 30 is defined between the upper bead 24 and an infuser body annular top surface panel generally designated 32. The annular top surface panel 32 includes a generally flat radially outer margin 34, forming a drinking area generally designated 36 including a preformed opening 37, preferably ½ inch in circumferential length and about ⅛ inch in width.

The infuser unit 10 also includes a well generally designated 38 for receiving a charge of tea or coffee ("T" in FIG. 3) or other products from which flavors may be extracted. The well 38 has a top opening generally designated 39 defined in part by a countersink wall portion 40 extending inwardly and downwardly from the inner margin of the annular top surface panel 32. A generally circular wall generally designated 41, and preferably of tapered form, extends downwardly from the countersink wall 40 into the cup interior to form the well 38. As shown, the walls 41 of the well 38 include portions with plural, spaced apart infusion openings 42 arranged in a geometric pattern.

If desired, the openings 42 may comprise plural slots in parallel array, or may be patterned or randomly disposed openings of various kinds, if desired. In the form shown in FIGS. 1–3, the well 38 is frusto-conical and includes a generally flat bottom wall 44.

The openings 42 are small enough to retain tea, coffee and/or flavor enhancers ("T") in the well 38, but are large enough to allow water to readily enter the interior of the well 38 to infuse the water with the flavors extracted from a charge of "T" or other flavoring agents. The openings are also large enough to allow diffusion of sugar or cream into the water or other liquid beverage 15, and the well depth is such that the initial water level $L_I$ (FIG. 2) will be well below the container rim 17 but above most of the well 38 to allow cream or sugar to be added and mix readily with the water or other liquid being flavored.

As illustrated in the embodiment of FIG. 2, one optional feature is a provision of a removable infuser unit cover generally designated 50 and shown to include a cover skirt generally designated 52 having a tapered skirt flange 54 and a groove 56 lying between a cover top panel 58 and a bead 60 separating the flange 54 from the remainder of the skirt 52. The top panel 58 preferably includes a depressed center section generally designated 62 connected by a countersink cover wall 64 which is congruent with the countersink wall 40 in the infuser unit 10. The cover 50 is removably secured to the infuser 10 by cooperative interfitting of the cover groove 56 and the beaded outer surface of the groove 28 in the infuser.

As illustrated in FIG. 2A, the infuser cover 50 may be a separate piece that is used with a form of infuser 10 that has an opening 37 in its drinking area 36. The cover 50 has a lift-up tab in the form of a truncated sector 66 defined by lines of weakness 70, 72 extending radially inwardly toward a foldline 74 formed in the outer margin 68 of the cover 50. Optionally, the foldline could be formed within the depressed center section 62 of the cover 50. Preferably, the lift-up tab 66 includes a grasping extension 76, and there are notches 78, 80 forming areas of stress concentration wherein tearing along the lines of weakness 70, 72 may be initiated.

In this application, the cover 50 is snapped over the infuser after the water has been poured over the tea in the well. When it is time to sip the beverage, the extension 76 of the lift-up tab 66 is grasped and pulled up, exposing the opening 37 in the radially outer margin 34 of the infuser top panel 32. In the alternative, as shown in FIG. 8, the infuser 10 may be removed from the container 12 after use. Thereafter, the cover 50 may be placed on the rim 17 of the container 12 in liquid-tight relation. For reasons which will appear, these steps are optional. An optional form of cover is described elsewhere herein.

Referring now to FIGS. 4–6, several alternate forms of the infuser are shown. Referring first to FIG. 4, an infuser generally designated 110 is shown to be similar to its counterpart 10 in FIGS. 1–3, and to include an opening 137 placed in the drinking area of the panel 132 of the body 118. The principal differences in the embodiment of FIG. 4 and that of FIG. 1 is that the well walls 140 are shown to taper to a point, or nearly so at the bottom, i.e., the construction does not require a flat bottom wall to form the well 138. In addition, the slots 142 are shown as being narrower and more numerous than their counterparts in FIGS. 1–3.

FIG. 5 shows another modified embodiment of the infuser generally designated 210, and shown to include the opening 237 in the drinking area, i.e. a part of the annular panel 232. The rim gripping portion generally designated 221, including the beaded skirt 220, resembles its counterpart in FIGS. 1–3. In the embodiment of FIG. 5, however, instead of slots, the walls 241 of the well 238 comprise a fine mesh screen material. This permits the walls 241 and the bottom 244 of the well 238 to be liquid- permeable for permitting water to flow to and through the tea or other flavoring product.

FIG. 6 shows a further embodiment of the infuser generally designated 310 associated with a cup 312 and shown to have needle- or pin- perforated walls 341 forming the well 338. In this instance, the drinking area generally designated 336 includes a preformed opening 337 formable by a lift-up tab 366 defined by lines of weakness 370, 372 terminating adjacent a transverse foldline 374.

The tab 366 preferably includes a grasping extension portion 376. The lines of weakness 370, 372 terminate at their radially outer ends in notches 378, 380 that serve as areas of stress concentration to initiate tearing. One optional feature is shown in FIG. 6, namely, a fill line or water level marker 377 embossed or printed in the sidewall 341. This aids the user or server in filling the container to a desired level, such as $L_1$ shown in FIG. 2.

It will be appreciated that the different wall configurations, drinking openings, etc. may be made in different combinations than those illustrated and thus the invention is susceptible to embodiment in various permutations and combinations.

Referring now to FIGS. 7 and 8, a still further embodiment of the infuser generally designated 410 is shown. Here, the illustrated form of infuser 410 includes the annular top surface panel 432, a well generally designated 438 and a drinking area 436 with the opening 437 formed therein, and the series of beads and grooves in the skirt portion 420 of the infuser 410. The slot-style openings 442 are also shown with solid spaces 443 between arrays of slot openings 442.

In this embodiment, the bottom wall 444 is shown as being imperforate, as is one circumferential portion 445 of the wall 441. As best shown in FIG. 8, this provides a non-drip feature if the infuser 410 titled toward the solid wall side as it is being is removed from the container 412.

While it will be understood that the infuser of the invention may be utilized in different ways, a description will now be given of the presently preferred manners of taking maximum advantage of the various features of the invention. In ordinary circumstances, one preferred form of brewing tea or coffee is to place a charge of tea, coffee grounds, or flavoring agents ("T") taken from a bulk source by a measuring spoon or the like (not shown) and insert the charge of "T" into the pocket or well portion 38, 438 of the infuser 10, 410. This may be done before or after the infuser 10 is associated with the container 12. Associating the infuser with the container is done by simply covering the rim 17 of the container 12 with the flange 22 on the infuser skirt 20 and pushing down until the rim 17 snaps into the groove 28, where it seals the well.

Thereupon, and having reference to the level marker 377 of FIG. 6, for example, very hot water is poured over the "T" in the pocket or well 38, 238, 338, etc. until the upper surface 19 of the water 15 in the container 12 is aligned with the initial or upper level mark 377.

Referring to FIG. 2, this would be at the initial level mark $L_I$, wherein the lower portion of the well or pocket is significantly beneath the top surface 19 of the water. Thereupon, flavors are extracted from the charge "T" by the water, and infused into the mass of water. This method has the advantage of directly contacting the charge "T" with the water when it is at its most elevated temperature. After allowing the beverage to steep for a moderate time, such as two to five minutes, the beverage nay be sipped by tilting the container to the position of FIG. 3 and allowing the user to drink from the opening or port 37, 137, etc. If the cover unit 50 is in place, this may include lifting up the sector tab 66 to expose the opening 37 (FIG. 2A) In the embodiment of FIG. 6, the tab 366 is formed in the infuser 310 itself.

In practice, it has been found that the array or charge of wetted tea leaves, coffee grounds, or flavoring agents ("T") often effectively form a plug "P"(FIG. 3) within the pocket or well, confining the beverage against spillage from the well, and yet allowing the user to sip the beverage from the opening. In so doing, the liquid level in the container is lowered, less and less of the water 15 is in contact with the mass of T, and when lower level $L_L$ (FIG. 3) is reached, further extraction or infusion ceases altogether and the beverage then simply retains the strength it then has. According to the invention, the plug "P" of expanded and wetted tea leaves, coffee grounds, or :flavoring agents, in effect also serves as an insulating mass, so the effectively closed container will then maintain the beverage at a hot to warm temperature level for an extended period of time.

If it is desired to extend the time of drinking and further reduce heat transfer, optional steps are available. First, the removable cover 50 may be snapped in place over the infuser 10 as shown in the exploded view of FIG. 2, for example. This may be done before or after the water level has been lowered towards $L_2$, i.e., when the potential for increase in beverage strength has been eliminated. In this regard, an alternate method of controlling beverage strength or saturation is shown in FIG. 8, which should be viewed in connection with FIG. 2.

In FIG. 8, an infuser 410 containing an imperforate sidewall section 445 is shown to be removed, before or after the liquid level is lowered, but a measurable time after initial infusion. Preferably, when the beverage has achieved the desired strength, the infuser 410 is removed and tilted to one side, whereby the combination of imperforate bottom wall 444 and sidewall sectors 445 prevents possible undesired dripping from the saturated charge of "T" contained in the well 438.

When the infuser 410 is removed, the lid 50 is placed over the container 12 for purposes of heat retention. Thereafter, drinking from the container is accomplished by removing the lid, or, as shown in FIGS. 2A or 6, by lifting the tab 66 to provide a drinking opening of the illustrated type.

Figure 9:
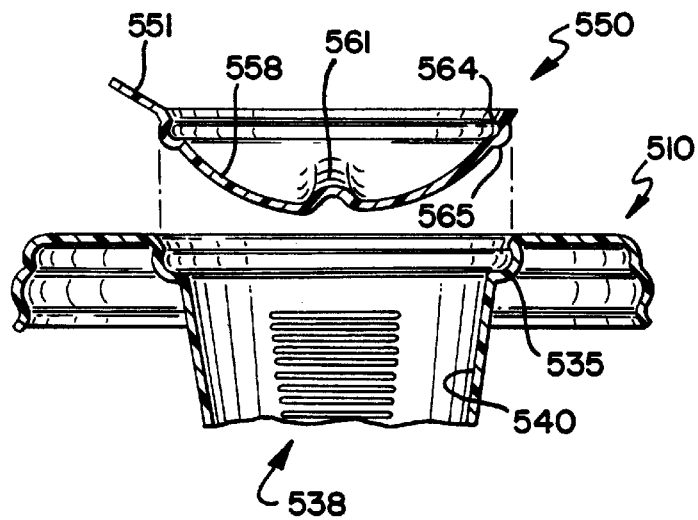
FIG. 9 is a fragmentary vertical sectional view, on a reduced scale, showing a modified form of cover used with one style of infuser made according to the invention.

Referring now to FIG. 9, one form of infuser 510 with an alternate form of well cover unit 550 is shown. In this illustration, it is understood that the infuser 510 is generally similar to the type shown in FIGS. 1–3, or that of FIGS. 4 through 8. However, unlike the cover 50 of the embodiments of FIGS. 2 and 9, the well cover 550 of FIG. 9 is a smaller diameter snap-in unit that includes an optional pull-tab 551 for easy removal, a well cover countersink wall portion 564 extending downwardly and terminating in a bead 565 of slightly enlarged diameter.

The main cover panel portion 558 of the well cover 550 is of a generally concave section, preferably and optionally having a center ridge portion 561 dividing the main panel into opposed half sections. The ridge 561 is contoured so that the cover may be grasped between the thumb and forefinger of a user for insertion into the infuser 510 as shown. In this connection, the infuser differs from its counterparts only in that its countersink wall 540 is somewhat more steeply inclined, and that a well cover-receiving annular groove 535 is also provided for cooperative retention of the bead 565 on the well cover 550.

The well portion 538 of the infuser 510 is understood to be generally similar to that of its counterparts although, for simplicity of illustration, it is shown with just a few representative slots or infusion openings. The function of the units is the same, except that the smaller cover unit 510 may reduce costs and provide a convenient way of covering only the top of the well portion for purposes of preventing spillage and heat retention during transport of the lidded container. Preferably, the well cover 510 is transparent to permit the use to determine the desired beverage strength by sight.

In the preferred form of making iced tea, the cup or container 12 of FIG. 1 is filled with an appropriate quantity of ice and the tea is placed in the pocket 38 with the infuser in place. Thereupon, the hot water is slowly poured into the pocket or well for maximum extraction under conditions of direct water-tea contact. As the just-brewed tea enters the container and moves to the bottom, it contacts the ice and then achieves its lower temperature.

In some preferred embodiments, the infuser unit is made from a thermoformable plastic material such as a styrene containing copolymer. Preferably, the thickness of the material as formed is about 0.010–0.015 inches. Depending on the forming method, the thickness may vary somewhat throughout the product. The choice of polymer used depends on the exact application, with those skilled in the art being aware of the requirements for flexibility, relatively easy tearability if a pull tab is present, overall stiffness and optionally, colorability. The ability to be embossed or imprinted with various legends, etc. can but need not be important. The openings in the sidewall and/or bottom of the well, whether circular, elongated slots or other formation are created in known ways, including the use of slitters, needle or contoured style punches, perforators, lasers, water jets, electric spark, or the like. The actual method of manufacture is not important to the success of the invention. The infuser skirt should be flexible enough to deform sufficiently that the rim gripping portions readily engage the curl or molded bead on the top of a container and create a snug enough fit to be substantially liquid tight. In some cases, a non-plastic material such as paper or fabric may be used, or even metals of thin cross section may be employed. If the infuser is made from more than one material, such as if the well is preformed from a material separate from or other than that from which the rim-engaging portion is made, the separate portions may be adhered to each other in the manufacturing process or at the serving location by heat sealing, adhesives, crimping, snap insert, threaded for screw attachment, or other ways known to those skilled in the art.

Figure 10:
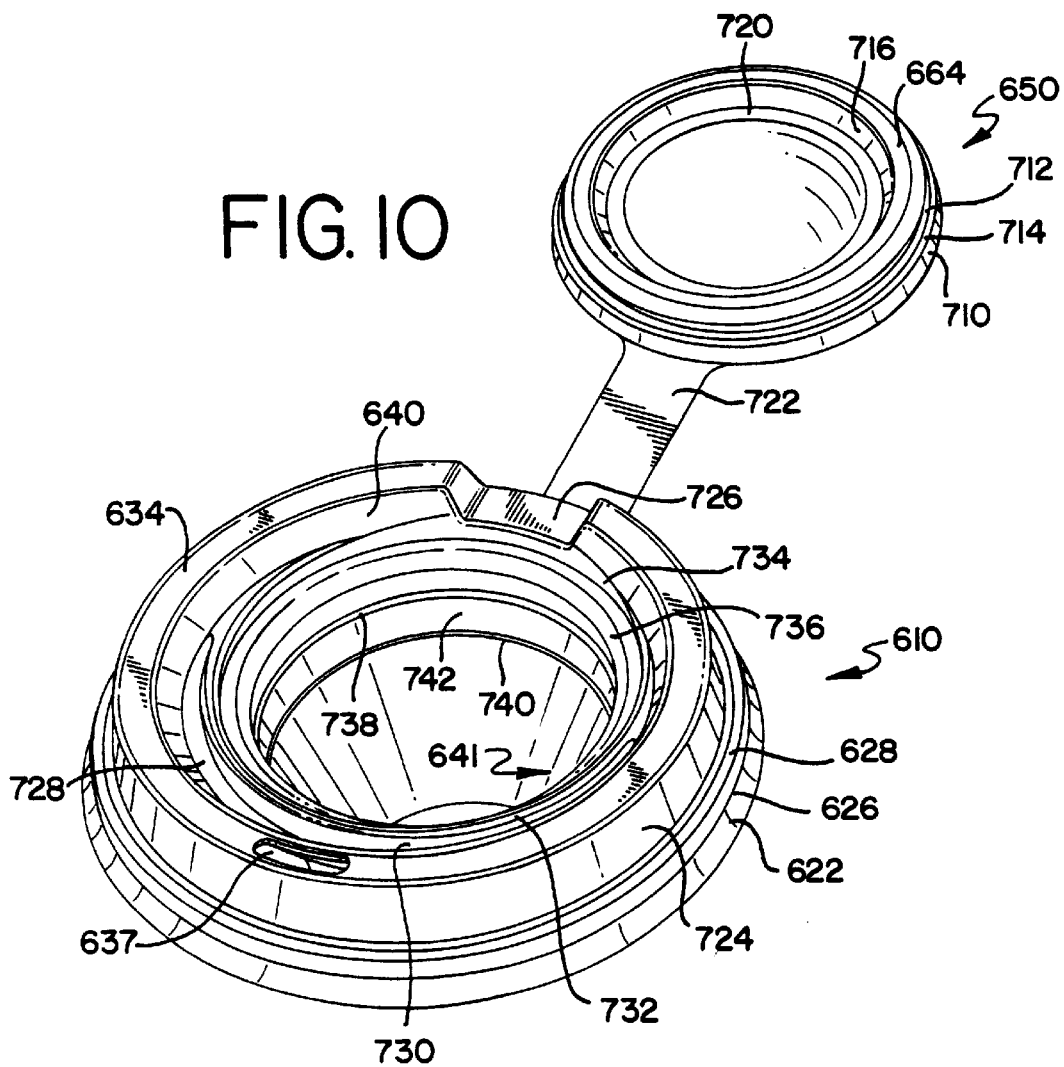
FIG. 10 is a perspective view of another preferred embodiment of the present invention, showing the infuser unit with an attached cover.

Another preferred embodiment of the infuser unit and cover is shown in FIGS. 10–16. In this embodiment, the infuser unit is attached to the cover portion by a flexible piece. As shown in FIGS. 10–12, the infuser unit is similar in many respects to the previously-described embodiments.

In particular, the infuser unit includes a container gripping portion 621 for attachment to the outside circumference of a cup or other liquid-containing drinking vessel. The container gripping portion is formed with a lower flange 622 and a seating groove 628, with an upper bead 624 and Lower bead 626 defining the outside of the seating groove. The flange is formed to allow the infuser to be slid into place over the container with the seating groove defined to hold the infuser in place on the cup or other drinking vessel. The details of the container attachment portion are shown in FIG. 14.

Directly above the container-gripping or attachment portion is the annular top surface panel. The panel has a flat outer margin portion 634 and a top side wall 724 that depends downward from the flat portion around the entire circumference of the top of the infuser unit. It is to be noted that while the infuser unit is shown in its preferred circular shape, the unit may be made of other shapes as desired. Different shapes, or colors of the infuser unit, may be used to identify different sizes or shapes of the infuser well for use with different teas or beverage types.

As shown in detail in FIG. 14, the inside wall 640 extends downward from the flat top portion 634 at an angle or curve. In this manner, an infuser upper trough 728 is created near the top of the infuser unit. At the radially inner portion of the upper trough 728, a tapered edge 730 extends upward to another inside rim 732. A drinking area is created along the flat top outer margin 634, next to the top opening wall 640. As shown in FIG. 12, an opening 637 is provided for drinking access to the beverage. While an opening is shown, it is noted that the drinking area can be omitted and the infuser unit may serve as a beverage making or brewing device, which is removed and discarded prior to drinking, or is used as a heat retention cover without a drinking access.

The internal structure of this embodiment of the infuser is shown in FIGS. 11 and 13. The well portion descends from the top portion of the infuser with side walls 641 that extend around the entire circumference of the infuser unit. The well bottom 644 is formed at the base of the side walls 641. In this embodiment, the well bottom 644 is preferably flat with circular holes 642 formed, punched or cut into the bottom 644 to permit the passage of liquid from the well inside to the outside and reverse circulation of liquid from outside to inside the well during the beverage brewing process.

The side walls 641 of the well are formed integrally with the upper portion of the infuser unit. As shown in detail in FIG. 14, a rim 732 is formed radially inward along the top of the upper trough 728. A cover seat wall 734 extendes downward, and radially inward, from the rim 732, and then a well inner opening wall 736 is formed between the cover seat wall 734 and an upper bead 738. A cover seating groove 742 is then formed between the upper bead 738 and the radially inward lower bead 740. As will be described in more detail, the cover is seated in this groove when in the closed position in the infuser unit. The upper bead 738 and lower bead 740 serve as markers or indicators for water levels as the water is added to the well.

As noted with regard to the prior embodiments, the well and infusion openings for passage of liquid may be of any number of shapes and sizes. In this embodiment, the sidewalls are preferably sloping downward to a flat bottom. The well must be deep enough to permit water to flow into and out of the well when the infuser is placed in the container and water is poured through the top of the infuser. The well must also be shallow enough so that the beverage is above the liquid level upon removal of a small amount of liquid so that the beverage will not continue to brew after reaching the desired strength. The well may be of a different depth for different beverages, such as in the making of iced tea. The well walls may also be stepped as well as sloped.

The slightly curved sides of the well create a funnelling effect for the tea, coffee, flavoring agents and water. That is, the sides channel the loose tea, coffee grounds, or flavoring agents, or a tea bag, into the bottom of the infuser and direct the near-boiling hot water over them to enhance circulation of the water prior to brewing. The cone shape is also preferable from a manufacturing standpoint with regard to ease of molding and stacking of the manufactured units.

Also, in this embodiment, the holes are preferably located only along the flat bottom. This location allows the greatest amount of flow of water out of the well after contacting the tea, coffee, or flavoring agents. Additionally, the holes are most easily formed or manufactured in the preferred thermoformed embodiment when they are placed along the flat bottom. It is also believed that the use of the holes on the bottom of the well provides improved flow of water through the holes. While the size of the holes may vary, in one embodiment 0.40 inches was found to be satisfactory for brewing of tea from leaves; other hole diameters and configurations may be preferred for brewing or infusing other beverages.

As shown in FIGS. 11 and 12, the cover 650 is preferably attached to the infuser unit 610 by a flexible strip or attachment piece 722. In this manner, the flexible piece is folded over through an integral notch portion 726 in the infuser unit to permit insertion and seating in the infuser unit. Pressure against the flexible strip 722 while the cover is seated in the closed position causes the cover to open or unseat from the infuser unit, or a lift-up tab may be added to the cover at some preferred location on flange 710 to accomplish the same purpose. Alternatively, the flexible strip may be formed with an integral hinge that pivots rather than bends or folds. Other types of attachment pieces are also possible. For example, ridges, protrusions or notches on the sides of the notch may be used to lock down or secure the hinge.

The cover, as shown in FIGS. 10, 11 and 13, and in detail in FIG. 15, has a cover wall 710, or depending skirt, at one end. A cover seat side skirt 712 is formed above a lower bead 714, and it folds over with an interior rim 716 to form an inner trough 720. The opposite side of the inner trough 720 is formed by a convex portion or cover center portion 662. When the cover is seated in the infuser unit, and the infuser unit is removed from the beverage container and turned upside down, the trough acts to collect drips and other liquid from the infuser unit. Thus, unlike conventional infusion or brewing devices, the present invention avoids the dripping and other difficulties that result from removal of a used infusion device, such as a tea bag, from the liquid in the container. In some embodiments, the infuser unit may be configured so that when the unit is turned upside down it can be inserted into a container and carried with the container.

The cover also performs the function of keeping the contents of the infuser well in place as the cup is tipped toward the user's face during drinking. It also assists in retention of heat to maintain the high temperature of the water in the beverage. An attached, one-piece cover and infuser unit is also simpler and easier to use. The cover is directed into the seated position by the various ridges in the design of the infuser unit.

As shown in FIGS. 10 and 12, the infuser unit includes a flat outer portion along an upper rim that includes a drinking hole or opening for access to the liquid beverage. Preferably, the infuser unit and/or cover are made of a clarified plastic material that permits viewing of the color of the beverage. In this manner, the user of the infuser may view the darkness of the beverage as an indication of its strength and the need to remove some portion of the liquid to prevent further infusion or brewing.

As shown in FIG. 12, the center of the bottom of the well is offset from the center of the cover attachment portion of the infuser unit. Preferably, the center of the well is offset away from the drinking area and toward the notch 726 for the flexible strip 722. It is believed that the offset of the well away from the drinking area provides a smoother flow of liquid to the drinking area when the infuser is used for drinking, helps keep the infuser contents out of the liquid when tipped for drinking, and also simplifies manufacture by shortening the length of the flexible strip or attachment piece 722.

Another preferred embodiment of the infuser unit and cover is shown in FIGS. 17–23. This embodiment is similar to the embodiment shown in FIGS. 10–16, with some modifications and simplifications. In particular, the infuser unit has a container-gripping portion with a lower flange 822 and a seating groove 828 for attachment to the beverage container. The annular top surface of this embodiment includes flat outer margin portion 834 and top side wall 824 that depends downward from the flat portion. In contrast to the embodiment of FIG. 10, the flat portion 834 is wider and extends further inward in the radial direction.

A trough is created between rim 832 and opening wall 840. The trough blends into the wall 840 at the notch 826. As shown in FIGS. 20 and 21, a drinking area is formed in the top of the annular top surface. Opening 837 is slightly recessed from edge 839 to create a more optimal drinking opening by rounding the portions that come in contact with the user's lips and prevents dripping when the infuser unit and cover are removed from the cup and inverted.

The well inner opening wall 836 is located radially inward of the rim 832. FIGS. 18 and 23 illustrate the structure of the infuser unit. A cover seating groove 842 is formed between upper and lower beads, which serve as water level indicators. As with the earlier embodiments, the well wall 841 slopes downward from the cover seating groove.

The cover in this embodiment, shown in FIGS. 17, 19 and 23, is also simplified from some earlier embodiments. Cover 850 includes a single seat 912. A trough 920 is formed between the convex center portion 862 and the seat 912.

The notch 826 formed in this embodiment of the infuser unit includes a recessed portion 858 that leads to air access or vent hole 851. The recess leads to a flat portion in which the air vent hole is punched or formed. In an upright position, the recess assists in the collection of liquid that escapes the cup; in a removed and inverted position, the recess prevents condensation from leaking through the air vent hole.

An additional embodiment of the infuser unit is shown in FIGS. 24, 25 and 26. In this embodiment, the cover attachment portion has been eliminated. The infuser unit is slid into the cup for a snap fit or friction fit in which base 950 acts to hold the tea leaves and walls 951 hold the infuser in container 930. The infuser is at a level equal to or below the container rim 935 and not attached to the rim, thereby leaving the cup rim and lid seal unaffected. Access from the well 950 to the inside of the container is provided by perforated portion 953 which provides a large gap or aperture between the container and the infuser unit to facilitate sipping. The opening 953 prevents liquid from being trapped in the infuser. The infuser includes a handle 940 that extends upward at an angle to permit the tea to drip downward. A conventional lid 945 may be placed over the top of the cup.

Figure 27:
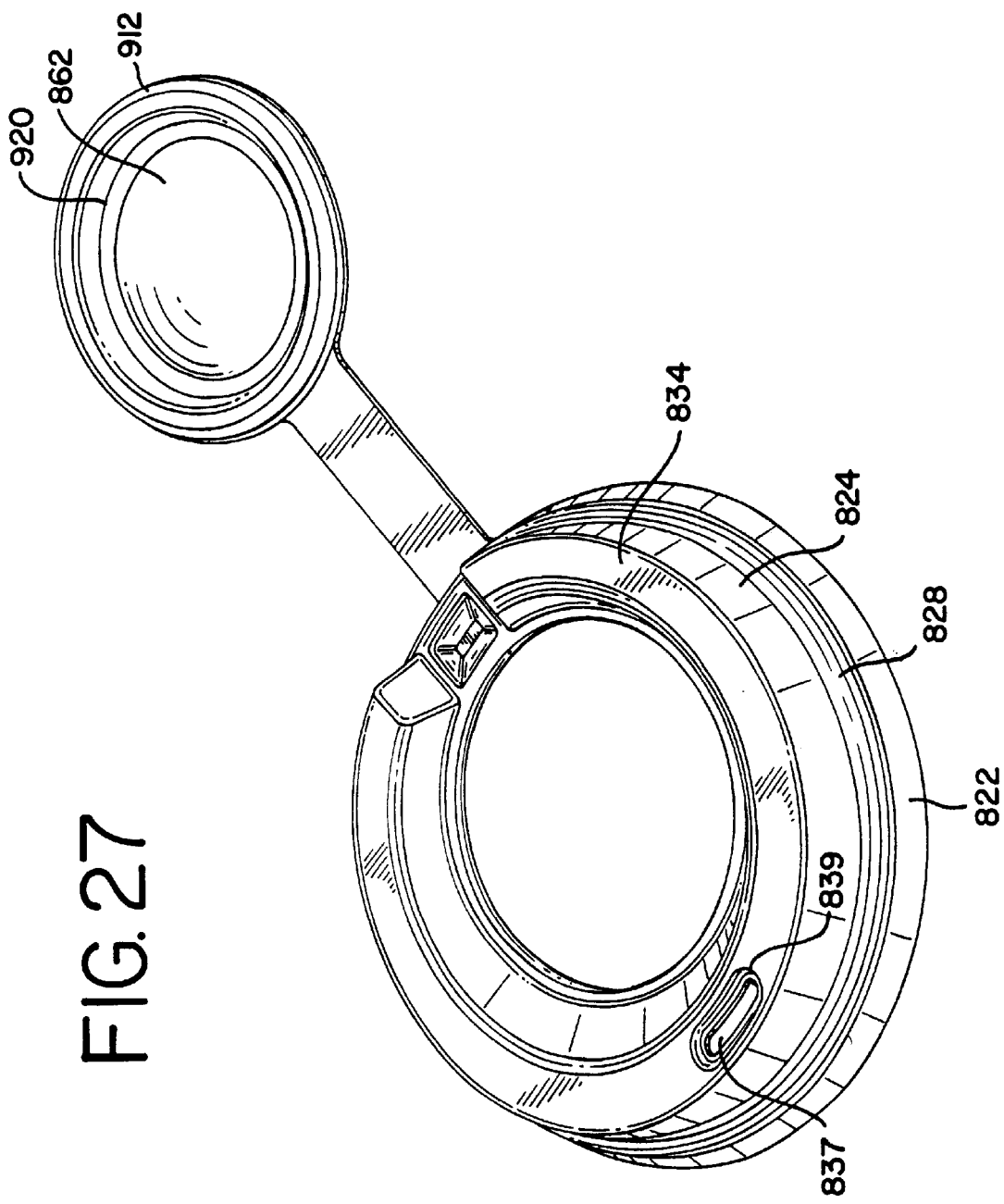
FIG. 27 is another embodiment of the infuser unit of the present invention in which the infuser well is removed from the infuser unit of FIG. 17 and the lid portion may be used alone or with the infuser well inserted into the lid portion.

In FIG. 27, an embodiment of the infuser unit of FIG. 17 is shown in which the infuser well has been removed. With the exception of the infuser well, the parts of the embodiment of FIG. 27 are identical to the embodiment of FIG. 17 and are identified accordingly. The embodiment of FIG. 27 may be used with a precharged infuser unit, which is inserted and snapped into place in the center aperture of the lid. For example, infuser wells may be precharged with different types and amounts of tea leaves or other beverage grains, which are selected upon the indicated desire of the consumer. The infuser unit is then placed over the container and the beverage is prepared, without the need for measuring and preparing portions of the tea leaves, coffee or other beverage grains at the time of purchase.

Alternatively, the embodiment of FIG. 27 provides an improved beverage lid with a removable cover. The improved lid permits access to the beverage without removing the lid from the container. In conventional lids, which lack a removable cover, the lid must be removed to add condiments, such as cream and sugar, to the beverage. When the lid is removed from the hot, steaming beverage, condensation often forms on the rim or bead of the container. When the lid is returned to the rim of the container, the presence of condensation prevents the formation of a liquid-tight seal between the lid and the container. Thus when the container is moved as the user leaves the counter or other location in the beverage store, small amounts of the beverage begin to leak or leave the container and flow down the outside of the container. The improve lid avoid the need to remove the lid from the container and thus prevent this problem of convention lids.

Figure 29:
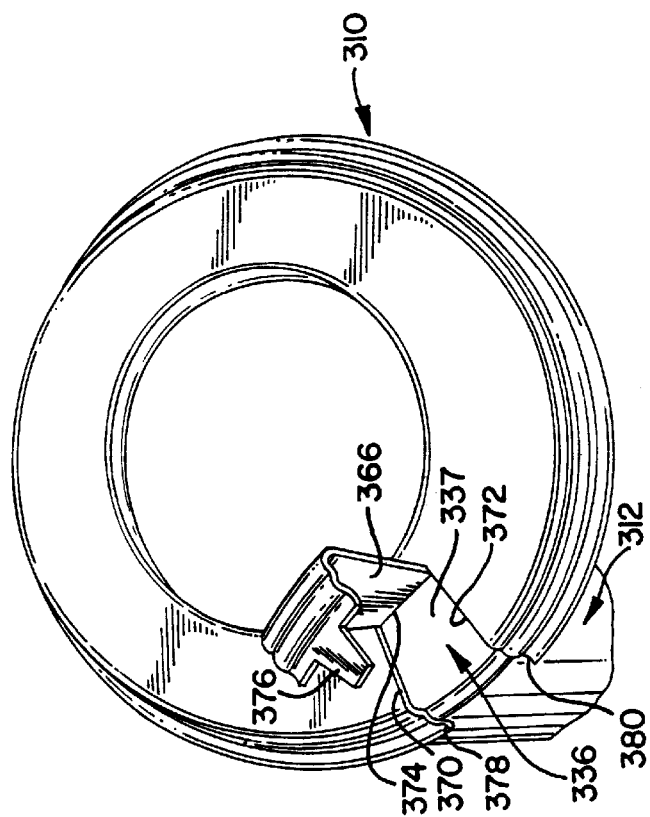
FIG. 29 is another embodiment of the infuser unit of the present invention in which the infuser well is removed from the infuser unit of FIG. 6 and the lid portion may be used alone or with the infuser well inserted into the lid portion.
Figure 28:
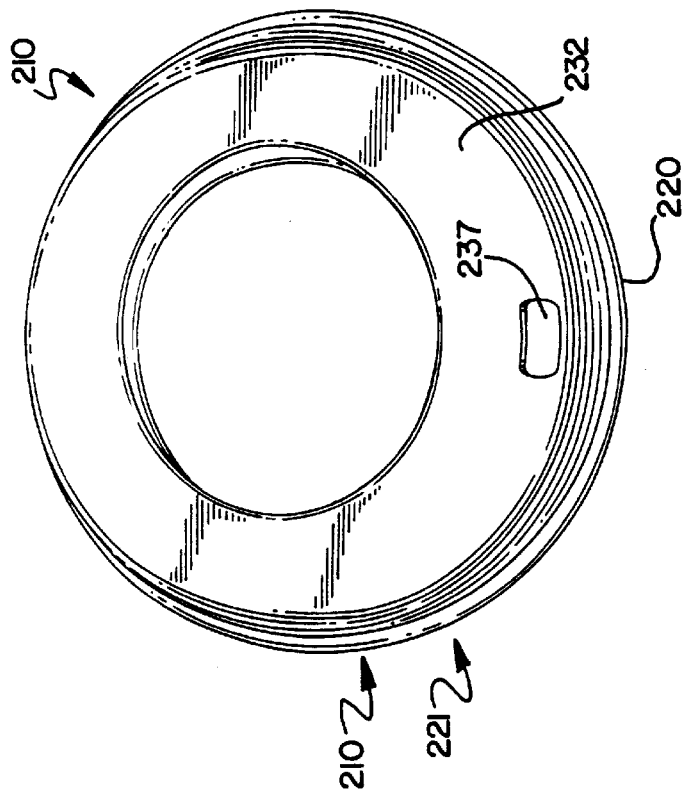
FIG. 28 is another embodiment of the infuser unit of the present invention in which the infuser well is removed from the infuser unit of FIG. 5 and the lid portion may be used alone or with the infuser well inserted into the lid portion.

FIGS. 28 and 29 are modification of the infuser units of FIGS. 5 and 6, respectively, to remove the infuser well, in the same manner that the embodiment of FIG. 27 is a modification of the embodiment of FIG. 17. The lid of FIGS. 28 and 29 operates in the same manner, and provides the same advantages, as the lid of FIG. 27, but without the presence of a cover. Alternatively, the snap up lid portion 366 shown in FIG. 29 may be used with the embodiment having a cover, which is shown in FIG. 27.

Figure 30:
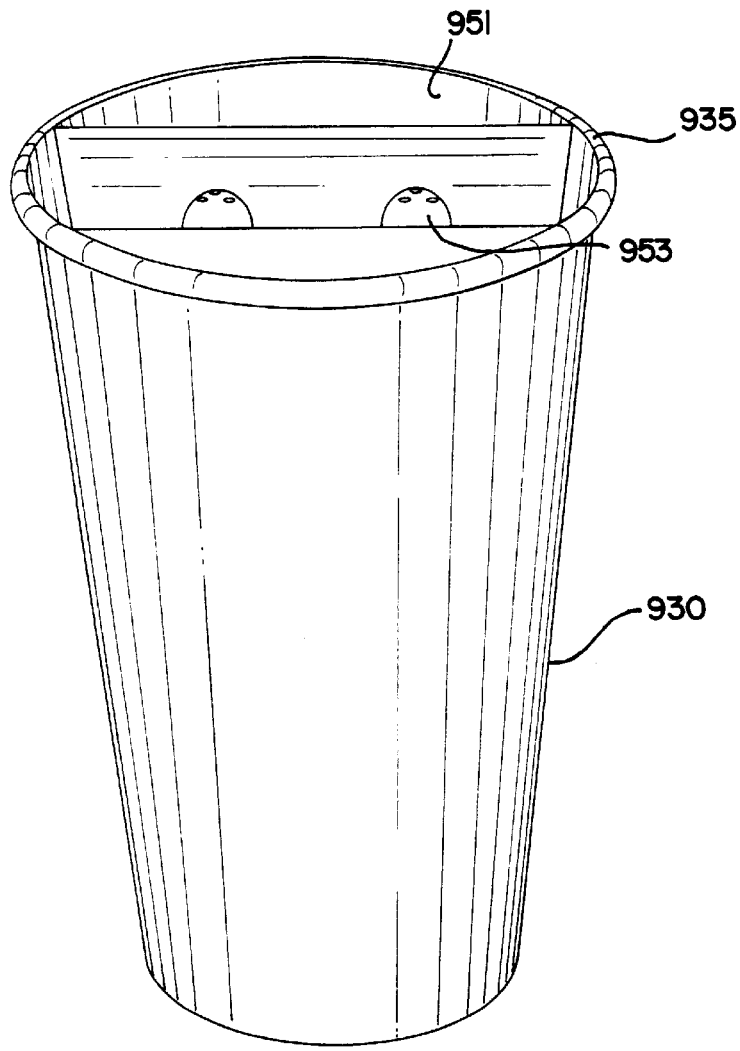
FIG. 30 is a perspective view of another embodiment of the infuser unit of the present invention with the infuser unit inserted in a beverage container below the upper lip of the container; and, FIG. 31 is a top view of the infuser unit of FIG. 30 inserted in a beverage container.
Figure 31:
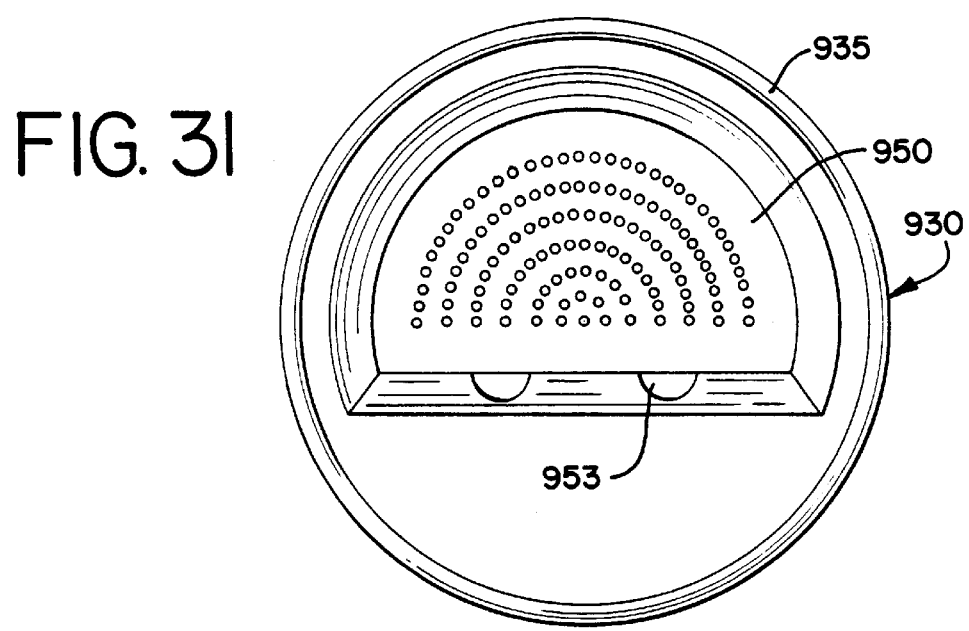

FIGS. 30 and 31 illustrate another embodiment of the infuser unit, which is similar to the embodiment shown in FIGS. 24, 25 and 26, and the parts of the unit of FIGS. 30 and 31 are identified with the same numbers as the unit of FIGS. 24, 25 and 26. In that embodiment, the infuser unit is placed within the container at a location below the upper bead or rim of the container. Water is added to the well and permitted to flow over the beverage grains or tea leaves and into the container.

In some of the embodiments of the previously-described infuser units, the apertures or slots in the well may be eliminated. In such a unit, the well portion of the infuser unit can serve as a storage area for food items that can be kept separate from the liquid in the container of the beverage. In this manner, the infuser unit provides an improved beverage lid that assists in holding food items, such as pretzels or small nuts that may be consumed along with the beverage. Additionally, the well portion could be used for promotional items, such as small toys or prizes, that can be kept covered in the well, which is opened by the consumer after purchase of the beverage. In this manner, the infuser unit provides a lid that enables prizes or other items to be prepackaged and then placed over the beverage at time of sale.

It will thus be seen the present invention provides a new and improved beverage infuser or brewer having a number of advantages and characteristics, including those pointed out herein and others which are inherent in the invention. Several preferred embodiments having been described by way of illustration, it is anticipated that modifications to the described forms of product will occur to those skilled in the art and that such modification and changes may be made without departing from the spirit of the invention or the scope of the appended claims.

What is claimed is:

1. An infuser unit for making beverages in an associated container from a material from which flavors are extracted at elevated temperatures, comprising:

a container attachment portion for removable association with the rim of an associated liquid container in snug, liquid-tight relation, an annular cover panel portion extending radially inwardly from said container attachment portion, a well portion for receiving a charge of flavoring material, said annular cover panel portion having a substantial opening therein for the passage of large quantities of liquid directly into said well portion, said well portion being defined by walls extending downwardly from said cover panel portion and to a position substantially beneath said container attachment portion, said walls being radially spaced from said container attachment portion to provide a spaced relationship between said walls and said associated liquid container, a portion of said well extending below the level of a liquid in said associated container after liquid flows through the annular cover portion and out of said well portion to form a drinkable beverage in said associated container, at least a portion of said well being liquid-permeable to permit water circulation between the regions lying respectively inside and outside said well to permit infusion of flavors from said flavoring materials to said liquid.

2. The infuser unit of claim 1 wherein said container attachment portion is removable from said associated liquid container.

3. The infuser unit of claim 1 wherein said container attachment portion is snugly attached about the entire periphery of the outside of said associated container as said liquid flows through said container attachment portion, said annular cover panel portion opening and said well portion into said associated container.

4. The infuser unit of claim 1 wherein said infuser unit is removable from said associated container after said liquid flows from said well portion into said associated container.

5. The infuser unit of claim 1 wherein said well portion has a flat bottom.

6. The infuser unit of claim 5 wherein said liquid permeable portion of said well further comprises apertures located only along the bottom of said well portion.

7. The infuser unit of claim 1 wherein said well has a cross-sectional area sufficiently great to permit continuous flow between the well and the associated container.

8. The infuser unit of claim 7 wherein said well has a cross-sectional area formed by a top width of said well being equal to the diameter of the opening of said annular cover panel portion.

9. The infuser unit of claim 8 wherein said well has wall portions that slope radially inward from the top of said well to the bottom of said well.

10. The infuser unit of claim 1 wherein said well is removable from said annular cover panel portion.

11. The infuser unit of claim 1 wherein said well portion includes a groove formed to permit seating of an associated cover portion.

12. The infuser unit of claim 1 further comprising an associated cover portion for seating engagement within said annular cover panel portion of said infuser unit.

13. The infuser unit of claim 12 wherein said associated cover portion is seated within a groove located radially between said infuser annular cover panel portion and said infuser well.

14. The infuser unit of claim 1 wherein said container attachment portion fits within the inside of the rim of the associated liquid container.

15. The infuser unit of claim 1 wherein said charge of flavoring material is loosely situated on the bottom of said well portion.

16. A method of making beverages with an infuser unit and an associated container from a material from which flavors are extracted at elevated temperatures, said method comprising the steps of:

placing an infuser unit within an associated container, said infuser unit having a container attachment portion for removable association with the outside of said associated liquid container in a snug, liquid-tight relation, said infuser unit including an annular cover panel portion extending radially inwardly from said container attachment portion, and said infuser unit including a well portion for receiving a charge of flavoring material, said well portion being defined by walls that extend downwardly from said annular cover panel portion and to a position substantially beneath said container attachment portion, said walls being radially spaced from said container attachment portion to provide a spaced relationship between said walls and said associated liquid container, at least a portion of said well portion being liquid-permeable to permit liquid circulation between the regions lying respectively inside and outside said well to permit infusion of flavors from said flavoring materials to said liquid, placing a charge of flavoring material inside said well of said infuser unit, adding water at an elevated temperature through an opening in said annular cover portion into said well portion to cover said charge of flavoring material, said annular cover panel portion opening being sufficiently large to permit the passage of said water from outside said infuser unit directly into said well portion, permitting said water to flow over said charge of flavoring material and through said liquid-permeable well portion and into said associated container, allowing said liquid to circulate between said outside and inside of said well to permit infusion of flavors from said flavoring materials to said liquid in said associated container.

17. The method of claim 16 further including the steps of removal of said infuser unit from said associated container upon determination that sufficient flavors have infused from said flavoring materials to said liquid in said associated container.

18. The method of claim 16 wherein said flavoring materials comprise tea.

19. The method of claim 18 further including the steps of addition of cubes of frozen water to said associated container before placing said infuser unit over said associated container.

20. The method of claim 16 wherein said infuser unit includes an associated cover portion, said cover portion being placed over said well portion after said water addition step to retain heat from said water within said infuser unit and said associated container.

21. The method of claim 20 wherein said associated cover portion is attached to said infuser unit by a flexible member.

22. The method of claim 16 wherein said step of placing said charge of flavoring material inside said well of said infuser unit is performed before said step of placing said infuser unit within said container.

23. An infuser unit for making beverages in an associated container from a material from which flavors are extracted at elevated temperatures, comprising:

a container attachment portion for removable association with the rim of an associated liquid container in snug, liquid-tight relation, an annular cover panel portion extending radially inwardly from said container attachment portion, a well portion for receiving a charge of flavoring material, said well portion being defined by walls extending downwardly from said cover panel portion and to a position substantially beneath said container attachment portion, a portion of said well extending below the level of a liquid in said associated container after liquid flows through the annular cover portion and out of said well portion to form a drinkable beverage in said associated container, at least a portion of said well being liquid-permeable to permit water circulation between the regions lying respectively inside and outside said well to permit infusion of flavors from said flavoring materials to said liquid, said well extends to a depth in the associated container such that the distance between the bottom of said associated container and the bottom of said well portion is greater than the distance between said bottom of said well portion and the annular cover portion.

24. The infuser unit of claim 23 wherein said well includes at least one annular ring indicating a liquid level for the addition of fluid to said well.

25. The infuser unit of claim 24 wherein said well includes a plurality of annular rings to indicate a liquid level for the addition of fluid to said well.

26. An infuser unit for making beverages in an associated container from a material from which flavors are extracted at elevated temperatures, comprising:

a container attachment portion for removable association with the rim of an associated liquid container in snug, liquid-tight relation, an annular cover panel portion extending radially inwardly from said container attachment portion, a well portion for receiving a charge of flavoring material, said well portion being defined by walls extending downwardly from said cover panel portion and to a position substantially beneath said container attachment portion, a portion of said well extending below the level of a liquid in said associated container after liquid flows through the annular cover portion and out of said well portion to form a drinkable beverage in said associated container, at least a portion of said well being liquid-permeable to permit water circulation between the regions lying respectively inside and outside said well to permit infusion of flavors from said flavoring materials to said liquid, the center of said well is offset from the center of said container attachment portion.

27. The infuser unit of claim 26 wherein said infuser unit includes a drinking area, said center of said well being offset away from said drinking area.

28. An infuser unit for making beverages in an associated container from a material from which flavors are extracted at elevated temperatures, comprising:

a container attachment portion for removable association with the rim of an associated liquid container in snug, liquid-tight relation, an annular cover panel portion extending radially inwardly from said container attachment portion, a well portion for receiving a charge of flavoring material, said well portion being defined by walls extending downwardly from said cover panel portion and to a position substantially beneath said container attachment portion, a portion of said well extending below the level of a liquid in said associated container after liquid flows through the annular cover portion and out of said well portion to form a drinkable beverage in said associated container, at least a portion of said well being liquid-permeable to permit water circulation between the regions lying respectively inside and outside said well to permit infusion of flavors from said flavoring materials to said liquid, an associated cover portion for seating engagement within said annular cover panel portion of said infuser unit, said cover portion is fixedly attached to said infuser unit by a flexible member.

29. The infuser unit of claim 28 wherein said flexible member is located in an integral notch in said annular cover portion of said infuser unit when said associated cover portion is in a seated position.

30. The infuser unit of claim 28 wherein said associated cover portion may be released from a seated position by applying pressure to said flexible member.

31. The infuser unit of claim 28 wherein said associated cover portion is formed with a trough portion, said trough portion acting to collect liquid excess from said well portion when said infuser unit is removed from said associated container.

32. The infuser unit of claim 28 wherein said associated cover portion is formed with a trough portion on its bottom side when said cover portion is seated in the closed position, said trough portion acting to collect liquid excess from said well portion when said infuser unit is removed from said associated container and placed on a surface with the container bottom side away from the surface.

33. The infuser unit of claim 32 wherein the bottom side of said cover attachment portion forms a trough portion to collect liquid excess from the outside of said well portion when said infuser unit is removed from said associated container and placed on a surface with the container bottom side away from the surface.

34. The infuser unit of claim 29 wherein said integral notch includes an aperture to permit venting of air.

35. The infuser unit of claim 29 wherein said integral notch is formed with sloping side portions to act to collect liquid excess along said cover attachment portion.

36. The infuser unit of claim 32 wherein said annular cover portion includes an drinking opening aperture formed in its surface, said aperture being slightly recessed below the surface of said cover portion.

37. A method of making beverages with an infuser unit and an associated container from a material from which flavors are extracted at elevated temperatures, said method comprising the steps of:

placing an infuser unit within an associated container, said infuser unit having a container attachment portion for removable association with the outside of said associated liquid container in a snug, liquid-tight relation, said infuser unit including an annular cover panel portion extending radially inwardly from said container attachment portion, and said infuser unit, including a well portion for receiving a charge of flavoring material, said well portion being defined by walls that extend downwardly from said annular cover panel portion and to a position substantially beneath said container attachment portion, at least a portion of said well portion being liquid-permeable to permit liquid circulation between the regions lying respectively inside and outside said well to permit infusion of flavors from said flavoring materials to said liquid, said infuser unit including an associated cover portion, placing a charge of flavoring material inside said well of said infuser unit, adding water at an elevated temperature through said annular cover portion into said well portion to cover said charge of flavoring material, permitting said water to flow over said charge of flavoring material and through said liquid-permeable well portion and into said associated container, placing said cover portion over said well portion after said water addition step to retain heat from said water within said infuser unit and said associated container, allowing said liquid to circulate between said outside and inside of said well to permit infusion of flavors from said flavoring materials to said liquid in said associated container, removal of the infuser unit from said associated container and placement of said infuser unit and associated cover portion against a flat surface so that excess liquid from said well portion flows into said cover portion.

38. The method of claim 37 wherein said cover portion includes an integrally formed trough portion to collect said excess liquid from said well portion.

39. The method of claim 37 wherein said cover portion includes an integrally formed trough portion to collect said excess liquid from said well portion when said infuser unit is removed from said container and placed on a surface with the cover bottom portion away from said surface.

* * * * *